United States Patent
Galvez et al.

(10) Patent No.: US 12,481,259 B2
(45) Date of Patent: Nov. 25, 2025

(54) BUILDING PLATFORM CHIP FOR DIGITAL TWINS

(71) Applicant: Tyco Fire & Security GmbH, Neuhausen am Rheinfall (CH)

(72) Inventors: Miguel Galvez, Westford, MA (US); Richard J. Campero, Irvine, CA (US); Eric G. Lang, Milwaukee, WI (US); Abu Bakr Khan, Franklin, WI (US); Donald A. Gottschalk, Jr., Racine, WI (US); Daniel M. Curtis, Franklin, WI (US); Trent M. Swanson, Wellington, FL (US); Karl F. Reichenberger, Mequon, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 362 days.

(21) Appl. No.: 18/096,965

(22) Filed: Jan. 13, 2023

(65) Prior Publication Data
US 2023/0213909 A1  Jul. 6, 2023

Related U.S. Application Data

(63) Continuation-in-part of application No. 17/710,775, filed on Mar. 31, 2022.
(Continued)

(51) Int. Cl.
*G05B 19/042* (2006.01)
(52) U.S. Cl.
CPC .. *G05B 19/042* (2013.01); *G05B 2219/25011* (2013.01)

(58) Field of Classification Search
CPC .... H05B 47/196; H05B 47/175; H05B 47/18; H05B 47/1975; H05B 47/1965;
(Continued)

(56) References Cited

U.S. PATENT DOCUMENTS 5,301,109 A  4/1994  Landauer et al.
5,446,677 A  8/1995  Jensen et al.
(Continued)

FOREIGN PATENT DOCUMENTS

AU  2019226217 A1  11/2020
AU  2019226264 A1  11/2020
(Continued)

OTHER PUBLICATIONS

Balaji et al, "Brick: Metadata schema for portable smart building applications," Applied Energy, 2018 (20 pages).
(Continued)

*Primary Examiner* — Jung Liu
(74) *Attorney, Agent, or Firm* — Foley & Lardner LLP

(57) ABSTRACT

A method can include activating a building platform chip integrated into a building device of a building and coupled with a processing circuit of the building device. The method can include retrieving, by the building platform chip, first data from the processing circuit of the building device through communication with the processing circuit. The method can include generating, by the building platform chip, second data to cause a digital twin of the building device to be constructed.

20 Claims, 10 Drawing Sheets

Related U.S. Application Data

(60) Provisional application No. 63/411,540, filed on Sep. 29, 2022, provisional application No. 63/299,772, filed on Jan. 14, 2022, provisional application No. 63/296,078, filed on Jan. 3, 2022.

(58) Field of Classification Search
CPC .. H05B 47/1985; H05B 47/155; G05B 15/02; G05B 2219/2642; G05B 2219/2614; H04L 12/2816; H04L 12/283; Y02B 20/40; G06F 3/04817; G06F 3/04847; F24F 11/64
See application file for complete search history.

(56) References Cited

U.S. PATENT DOCUMENTS

| | | | |
|---|---|---|---|
| 5,581,478 A | 12/1996 | Cruse et al. | |
| 5,812,962 A | 9/1998 | Kovac | |
| 5,960,381 A | 9/1999 | Singers et al. | |
| 5,973,662 A | 10/1999 | Singers et al. | |
| 6,014,612 A | 1/2000 | Larson et al. | |
| 6,031,547 A | 2/2000 | Kennedy | |
| 6,134,511 A | 10/2000 | Subbarao | |
| 6,157,943 A | 12/2000 | Meyer | |
| 6,285,966 B1 | 9/2001 | Brown et al. | |
| 6,363,422 B1 | 3/2002 | Hunter et al. | |
| 6,385,510 B1 | 5/2002 | Hoog et al. | |
| 6,389,331 B1 | 5/2002 | Jensen et al. | |
| 6,401,027 B1 | 6/2002 | Xu et al. | |
| 6,437,691 B1 | 8/2002 | Sandelman et al. | |
| 6,477,518 B1 | 11/2002 | Li et al. | |
| 6,487,457 B1 | 11/2002 | Hull et al. | |
| 6,493,755 B1 | 12/2002 | Hansen et al. | |
| 6,577,323 B1 | 6/2003 | Jamieson et al. | |
| 6,626,366 B2 | 9/2003 | Kayahara et al. | |
| 6,646,660 B1 | 11/2003 | Patty | |
| 6,704,016 B1 | 3/2004 | Oliver et al. | |
| 6,732,540 B2 | 5/2004 | Sugihara et al. | |
| 6,764,019 B1 | 7/2004 | Kayahara et al. | |
| 6,782,385 B2 | 8/2004 | Natsumeda et al. | |
| 6,813,532 B2 | 11/2004 | Eryurek et al. | |
| 6,816,811 B2 | 11/2004 | Seem | |
| 6,823,680 B2 | 11/2004 | Jayanth | |
| 6,826,454 B2 | 11/2004 | Sulfstede | |
| 6,865,511 B2 | 3/2005 | Frerichs et al. | |
| 6,925,338 B2 | 8/2005 | Eryurek et al. | |
| 6,986,138 B1 | 1/2006 | Sakaguchi et al. | |
| 7,031,880 B1 | 4/2006 | Seem et al. | |
| 7,401,057 B2 | 7/2008 | Eder | |
| 7,552,467 B2 | 6/2009 | Lindsay | |
| 7,627,544 B2 | 12/2009 | Chkodrov et al. | |
| 7,818,249 B2 | 10/2010 | Lovejoy et al. | |
| 7,889,051 B1 | 2/2011 | Billig et al. | |
| 7,996,488 B1 | 8/2011 | Casabella et al. | |
| 8,078,330 B2 | 12/2011 | Brickfield et al. | |
| 8,104,044 B1 | 1/2012 | Scofield et al. | |
| 8,229,470 B1 | 7/2012 | Ranjan et al. | |
| 8,401,991 B2 | 3/2013 | Wu et al. | |
| 8,495,745 B1 | 7/2013 | Schrecker et al. | |
| 8,516,016 B2 | 8/2013 | Park et al. | |
| 8,532,808 B2 | 9/2013 | Drees et al. | |
| 8,532,839 B2 | 9/2013 | Drees et al. | |
| 8,600,556 B2 | 12/2013 | Nesler et al. | |
| 8,635,182 B2 | 1/2014 | Mackay | |
| 8,682,921 B2 | 3/2014 | Park et al. | |
| 8,731,724 B2 | 5/2014 | Drees et al. | |
| 8,737,334 B2 | 5/2014 | Ahn et al. | |
| 8,738,334 B2 | 5/2014 | Jiang et al. | |
| 8,751,487 B2 | 6/2014 | Byrne et al. | |
| 8,788,097 B2 | 7/2014 | Drees et al. | |
| 8,805,995 B1 | 8/2014 | Oliver | |
| 8,843,238 B2 | 9/2014 | Wenzel et al. | |
| 8,861,452 B2 * | 10/2014 | Barbieri | H04W 48/10 |
| | | | 370/329 |
| 8,874,071 B2 | 10/2014 | Sherman et al. | |
| 8,903,448 B2 * | 12/2014 | Chande | H04W 52/34 |
| | | | 370/332 |
| 8,941,465 B2 | 1/2015 | Pineau et al. | |
| 8,990,127 B2 | 3/2015 | Taylor | |
| 9,070,113 B2 | 6/2015 | Shafiee et al. | |
| 9,116,978 B2 | 8/2015 | Park et al. | |
| 9,161,357 B2 * | 10/2015 | Horn | H04W 28/18 |
| 9,185,095 B1 | 11/2015 | Moritz et al. | |
| 9,189,527 B2 | 11/2015 | Park et al. | |
| 9,196,009 B2 | 11/2015 | Drees et al. | |
| 9,229,966 B2 | 1/2016 | Aymeloglu et al. | |
| 9,286,582 B2 | 3/2016 | Drees et al. | |
| 9,311,807 B2 | 4/2016 | Schultz et al. | |
| 9,344,751 B1 | 5/2016 | Ream et al. | |
| 9,354,968 B2 | 5/2016 | Wenzel et al. | |
| 9,507,686 B2 | 11/2016 | Horn et al. | |
| 9,524,594 B2 | 12/2016 | Ouyang et al. | |
| 9,558,196 B2 | 1/2017 | Johnston et al. | |
| 9,652,813 B2 | 5/2017 | Gifford et al. | |
| 9,668,088 B2 * | 5/2017 | Quinn | H04W 16/14 |
| 9,674,744 B2 * | 6/2017 | Xue | H04W 28/20 |
| 9,753,455 B2 | 9/2017 | Drees | |
| 9,811,249 B2 | 11/2017 | Chen et al. | |
| 9,838,844 B2 | 12/2017 | Emeis et al. | |
| 9,886,478 B2 | 2/2018 | Mukherjee | |
| 9,948,359 B2 | 4/2018 | Horton | |
| 10,054,919 B2 | 8/2018 | Westrick et al. | |
| 10,055,114 B2 | 8/2018 | Shah et al. | |
| 10,055,206 B2 | 8/2018 | Park et al. | |
| 10,116,461 B2 | 10/2018 | Fairweather et al. | |
| 10,169,454 B2 | 1/2019 | Ait-Mokhtar et al. | |
| 10,171,297 B2 | 1/2019 | Stewart et al. | |
| 10,171,586 B2 | 1/2019 | Shaashua et al. | |
| 10,187,258 B2 | 1/2019 | Nagesh et al. | |
| 10,514,963 B2 | 12/2019 | Shrivastava et al. | |
| 10,515,098 B2 | 12/2019 | Park et al. | |
| 10,534,326 B2 | 1/2020 | Sridharan et al. | |
| 10,536,295 B2 | 1/2020 | Fairweather et al. | |
| 10,564,993 B2 | 2/2020 | Deutsch et al. | |
| 10,572,230 B2 | 2/2020 | Lucas et al. | |
| 10,705,492 B2 | 7/2020 | Harvey | |
| 10,708,078 B2 | 7/2020 | Harvey | |
| 10,760,815 B2 | 9/2020 | Janakiraman et al. | |
| 10,762,475 B2 | 9/2020 | Song et al. | |
| 10,824,120 B2 | 11/2020 | Ahmed | |
| 10,845,771 B2 | 11/2020 | Harvey | |
| 10,854,194 B2 | 12/2020 | Park et al. | |
| 10,862,928 B1 | 12/2020 | Badawy et al. | |
| 10,921,760 B2 | 2/2021 | Harvey | |
| 10,921,972 B2 | 2/2021 | Park et al. | |
| 10,969,133 B2 | 4/2021 | Harvey | |
| 10,986,121 B2 | 4/2021 | Stockdale et al. | |
| 11,016,998 B2 | 5/2021 | Park et al. | |
| 11,024,292 B2 | 6/2021 | Park et al. | |
| 11,038,709 B2 | 6/2021 | Park et al. | |
| 11,041,650 B2 | 6/2021 | Li et al. | |
| 11,054,796 B2 | 7/2021 | Holaso | |
| 11,070,390 B2 | 7/2021 | Park et al. | |
| 11,073,976 B2 | 7/2021 | Park et al. | |
| 11,108,587 B2 | 8/2021 | Park et al. | |
| 11,113,295 B2 | 9/2021 | Park et al. | |
| 11,150,617 B2 | 10/2021 | Ploegert et al. | |
| 11,194,302 B2 | 12/2021 | Krishnamurthy et al. | |
| 11,229,138 B1 | 1/2022 | Harvey et al. | |
| 11,234,254 B2 * | 1/2022 | Hareuveni | H04W 72/0453 |
| 11,314,726 B2 | 4/2022 | Park et al. | |
| 11,314,788 B2 | 4/2022 | Park et al. | |
| 11,316,908 B1 | 4/2022 | Chakraborty et al. | |
| 11,444,871 B1 | 9/2022 | Nainar et al. | |
| 11,556,105 B2 | 1/2023 | Cooley et al. | |
| 11,561,522 B2 | 1/2023 | Cooley et al. | |
| 11,561,523 B2 | 1/2023 | Cooley et al. | |
| 11,573,539 B1 | 2/2023 | Chakraborty et al. | |
| 11,573,551 B2 | 2/2023 | Cooley et al. | |
| 11,586,167 B2 | 2/2023 | Cooley et al. | |
| 11,720,074 B2 * | 8/2023 | Krishnan | G05B 19/41835 |
| | | | 700/275 |
| 11,722,248 B1 | 8/2023 | Chakraborty et al. | |

(56) References Cited

U.S. PATENT DOCUMENTS

| | | | |
|---|---|---|---|
| 11,775,132 B1* | 10/2023 | McDannald | G06F 3/04815 715/741 |
| 11,782,410 B2* | 10/2023 | Krishnan | G05B 19/0423 700/275 |
| 11,843,475 B2* | 12/2023 | Marti | H04L 12/281 |
| 11,914,336 B2 | 2/2024 | Nadumane et al. | |
| 12,003,660 B2 | 6/2024 | Bernardi | |
| 12,107,789 B2* | 10/2024 | Sverdlov | H04L 5/001 |
| 12,170,664 B2 | 12/2024 | Setlur et al. | |
| 2002/0010562 A1 | 1/2002 | Schleiss et al. | |
| 2002/0016639 A1 | 2/2002 | Smith et al. | |
| 2002/0059229 A1 | 5/2002 | Natsumeda et al. | |
| 2002/0123864 A1 | 9/2002 | Eryurek et al. | |
| 2002/0147506 A1 | 10/2002 | Eryurek et al. | |
| 2002/0177909 A1 | 11/2002 | Fu et al. | |
| 2003/0005486 A1 | 1/2003 | Ridolfo et al. | |
| 2003/0014130 A1 | 1/2003 | Grumelart | |
| 2003/0073432 A1 | 4/2003 | Meade, II | |
| 2003/0158704 A1 | 8/2003 | Triginai et al. | |
| 2003/0171851 A1 | 9/2003 | Brickfield et al. | |
| 2003/0200059 A1 | 10/2003 | Ignatowski et al. | |
| 2003/0200285 A1 | 10/2003 | Hansen et al. | |
| 2004/0068390 A1 | 4/2004 | Saunders | |
| 2004/0128314 A1 | 7/2004 | Katibah et al. | |
| 2004/0133314 A1 | 7/2004 | Ehlers et al. | |
| 2004/0199360 A1 | 10/2004 | Friman et al. | |
| 2005/0055308 A1 | 3/2005 | Meyer et al. | |
| 2005/0108262 A1 | 5/2005 | Fawcett et al. | |
| 2005/0154494 A1 | 7/2005 | Ahmed | |
| 2005/0278703 A1 | 12/2005 | Lo et al. | |
| 2005/0283337 A1 | 12/2005 | Sayal | |
| 2006/0095521 A1 | 5/2006 | Patinkin | |
| 2006/0140207 A1 | 6/2006 | Eschbach et al. | |
| 2006/0184479 A1 | 8/2006 | Levine | |
| 2006/0200476 A1 | 9/2006 | Gottumukkala et al. | |
| 2006/0265751 A1 | 11/2006 | Cosquer et al. | |
| 2006/0271589 A1 | 11/2006 | Horowitz et al. | |
| 2007/0028179 A1 | 2/2007 | Levin et al. | |
| 2007/0203693 A1 | 8/2007 | Estes | |
| 2007/0261062 A1 | 11/2007 | Bansal et al. | |
| 2007/0273497 A1 | 11/2007 | Kuroda et al. | |
| 2007/0273610 A1 | 11/2007 | Baillot | |
| 2008/0034425 A1 | 2/2008 | Overcash et al. | |
| 2008/0094230 A1 | 4/2008 | Mock et al. | |
| 2008/0097816 A1 | 4/2008 | Freire et al. | |
| 2008/0186160 A1 | 8/2008 | Kim et al. | |
| 2008/0249756 A1 | 10/2008 | Chaisuparasmikul | |
| 2008/0252723 A1 | 10/2008 | Park | |
| 2008/0265799 A1 | 10/2008 | Sibert | |
| 2008/0281472 A1 | 11/2008 | Podgorny et al. | |
| 2009/0195349 A1 | 8/2009 | Frader-Thompson et al. | |
| 2010/0016683 A1 | 1/2010 | Lemmers et al. | |
| 2010/0045439 A1 | 2/2010 | Tak et al. | |
| 2010/0058248 A1 | 3/2010 | Park | |
| 2010/0131533 A1 | 5/2010 | Ortiz | |
| 2010/0274366 A1 | 10/2010 | Fata et al. | |
| 2010/0281387 A1 | 11/2010 | Holland et al. | |
| 2010/0286937 A1 | 11/2010 | Hedley et al. | |
| 2010/0324962 A1 | 12/2010 | Nesler et al. | |
| 2011/0015802 A1 | 1/2011 | Imes | |
| 2011/0047418 A1 | 2/2011 | Drees et al. | |
| 2011/0061015 A1 | 3/2011 | Drees et al. | |
| 2011/0071685 A1 | 3/2011 | Huneycutt et al. | |
| 2011/0077950 A1 | 3/2011 | Hughston | |
| 2011/0087650 A1 | 4/2011 | Mackay et al. | |
| 2011/0087988 A1 | 4/2011 | Ray et al. | |
| 2011/0088000 A1 | 4/2011 | Mackay | |
| 2011/0125737 A1 | 5/2011 | Pothering et al. | |
| 2011/0137853 A1 | 6/2011 | Mackay | |
| 2011/0153603 A1 | 6/2011 | Adiba et al. | |
| 2011/0154363 A1 | 6/2011 | Karmarkar | |
| 2011/0157357 A1 | 6/2011 | Weisensale et al. | |
| 2011/0178977 A1 | 7/2011 | Drees | |
| 2011/0191343 A1 | 8/2011 | Heaton et al. | |
| 2011/0205022 A1 | 8/2011 | Cavallaro et al. | |
| 2011/0218777 A1 | 9/2011 | Chen et al. | |
| 2012/0011126 A1 | 1/2012 | Park et al. | |
| 2012/0011141 A1 | 1/2012 | Park et al. | |
| 2012/0022698 A1 | 1/2012 | Mackay | |
| 2012/0062577 A1 | 3/2012 | Nixon | |
| 2012/0064923 A1 | 3/2012 | Imes et al. | |
| 2012/0083930 A1 | 4/2012 | Ilic et al. | |
| 2012/0100825 A1 | 4/2012 | Sherman et al. | |
| 2012/0101637 A1 | 4/2012 | Imes et al. | |
| 2012/0135759 A1 | 5/2012 | Imes et al. | |
| 2012/0136485 A1 | 5/2012 | Weber et al. | |
| 2012/0158633 A1 | 6/2012 | Eder | |
| 2012/0259583 A1 | 10/2012 | Noboa et al. | |
| 2012/0272228 A1 | 10/2012 | Marndi et al. | |
| 2012/0278051 A1 | 11/2012 | Jiang et al. | |
| 2013/0007063 A1 | 1/2013 | Kalra et al. | |
| 2013/0038430 A1 | 2/2013 | Blower et al. | |
| 2013/0038707 A1 | 2/2013 | Cunningham et al. | |
| 2013/0060820 A1 | 3/2013 | Bulusu et al. | |
| 2013/0081541 A1 | 4/2013 | Hasenoehrl et al. | |
| 2013/0086497 A1 | 4/2013 | Ambuhl et al. | |
| 2013/0097706 A1 | 4/2013 | Titonis et al. | |
| 2013/0103221 A1 | 4/2013 | Raman et al. | |
| 2013/0167035 A1 | 6/2013 | Imes et al. | |
| 2013/0170710 A1 | 7/2013 | Kuoch et al. | |
| 2013/0204836 A1 | 8/2013 | Choi et al. | |
| 2013/0212129 A1 | 8/2013 | Lawson et al. | |
| 2013/0246916 A1 | 9/2013 | Reimann et al. | |
| 2013/0247205 A1 | 9/2013 | Schrecker et al. | |
| 2013/0262035 A1 | 10/2013 | Mills | |
| 2013/0275174 A1 | 10/2013 | Bennett et al. | |
| 2013/0275908 A1 | 10/2013 | Reichard | |
| 2013/0297050 A1 | 11/2013 | Reichard et al. | |
| 2013/0298244 A1 | 11/2013 | Kumar et al. | |
| 2013/0331995 A1 | 12/2013 | Rosen | |
| 2013/0338970 A1 | 12/2013 | Reghetti | |
| 2014/0032506 A1 | 1/2014 | Hoey et al. | |
| 2014/0050229 A1 | 2/2014 | Kon et al. | |
| 2014/0059483 A1 | 2/2014 | Mairs et al. | |
| 2014/0081652 A1 | 3/2014 | Klindworth | |
| 2014/0135952 A1 | 5/2014 | Maehara | |
| 2014/0152651 A1 | 6/2014 | Chen et al. | |
| 2014/0172184 A1 | 6/2014 | Schmidt et al. | |
| 2014/0189861 A1 | 7/2014 | Gupta et al. | |
| 2014/0207282 A1 | 7/2014 | Angle et al. | |
| 2014/0258052 A1 | 9/2014 | Khuti et al. | |
| 2014/0269614 A1 | 9/2014 | Maguire et al. | |
| 2014/0277765 A1 | 9/2014 | Karimi et al. | |
| 2014/0278461 A1 | 9/2014 | Artz | |
| 2014/0327555 A1 | 11/2014 | Sager et al. | |
| 2014/0336795 A1 | 11/2014 | Asenjo et al. | |
| 2015/0019174 A1 | 1/2015 | Kiff et al. | |
| 2015/0042240 A1 | 2/2015 | Aggarwal et al. | |
| 2015/0105917 A1 | 4/2015 | Sasaki et al. | |
| 2015/0145468 A1 | 5/2015 | Ma et al. | |
| 2015/0156031 A1 | 6/2015 | Fadell et al. | |
| 2015/0168931 A1 | 6/2015 | Jin | |
| 2015/0172300 A1 | 6/2015 | Cochenour | |
| 2015/0178421 A1 | 6/2015 | Borrelli et al. | |
| 2015/0185261 A1 | 7/2015 | Frader-Thompson et al. | |
| 2015/0186777 A1 | 7/2015 | Lecue et al. | |
| 2015/0202962 A1 | 7/2015 | Habashima et al. | |
| 2015/0204563 A1 | 7/2015 | Imes et al. | |
| 2015/0235267 A1 | 8/2015 | Steube et al. | |
| 2015/0241895 A1 | 8/2015 | Lu et al. | |
| 2015/0244730 A1 | 8/2015 | Vu et al. | |
| 2015/0244732 A1 | 8/2015 | Golshan et al. | |
| 2015/0261863 A1 | 9/2015 | Dey et al. | |
| 2015/0263900 A1 | 9/2015 | Polyakov et al. | |
| 2015/0286969 A1 | 10/2015 | Warner et al. | |
| 2015/0295796 A1 | 10/2015 | Hsiao et al. | |
| 2015/0304193 A1 | 10/2015 | Ishii et al. | |
| 2015/0312891 A1* | 10/2015 | Quinn | H04W 4/02 455/452.1 |
| 2015/0316918 A1 | 11/2015 | Schleiss et al. | |
| 2015/0324422 A1 | 11/2015 | Elder | |
| 2015/0341212 A1 | 11/2015 | Hsiao et al. | |
| 2015/0348417 A1 | 12/2015 | Ignaczak et al. | |
| 2015/0379080 A1 | 12/2015 | Jochimski | |

(56) References Cited

U.S. PATENT DOCUMENTS

| | | |
|---|---|---|
| 2016/0011753 A1 | 1/2016 | Mcfarland et al. |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0313904 A1* | 10/2016 | Ahn .................... G06F 3/04817 |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0010874 A1 | 1/2017 | Rosset et al. |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0060574 A1 | 3/2017 | Malladi et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0085473 A1 | 3/2017 | Zhu et al. |
| 2017/0086112 A1* | 3/2017 | Xue .................... H04B 17/382 |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0118074 A1 | 4/2017 | Feinstein et al. |
| 2017/0123389 A1 | 5/2017 | Baez et al. |
| 2017/0134415 A1 | 5/2017 | Muddu et al. |
| 2017/0155557 A1 | 6/2017 | Desai et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277521 A1 | 9/2017 | Sharma et al. |
| 2017/0277769 A1 | 9/2017 | Pasupathy et al. |
| 2017/0277800 A1 | 9/2017 | Lucas et al. |
| 2017/0278003 A1 | 9/2017 | Liu |
| 2017/0294132 A1 | 10/2017 | Colmenares |
| 2017/0295058 A1 | 10/2017 | Gottschalk et al. |
| 2017/0315522 A1 | 11/2017 | Kwon et al. |
| 2017/0315697 A1 | 11/2017 | Jacobson et al. |
| 2017/0318647 A1 | 11/2017 | Vangeel et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2017/0364046 A1 | 12/2017 | Westrick et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0119975 A1 | 5/2018 | Park et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0191521 A1 | 7/2018 | Ahmed et al. |
| 2018/0198627 A1 | 7/2018 | Mullins |
| 2018/0203961 A1 | 7/2018 | Aisu et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0285800 A1 | 10/2018 | Wenzel et al. |
| 2018/0292797 A1 | 10/2018 | Lamparter et al. |
| 2018/0300124 A1 | 10/2018 | Malladi et al. |
| 2018/0309627 A1 | 10/2018 | Yarbrough et al. |
| 2018/0309818 A1 | 10/2018 | Park et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0074994 A1 | 3/2019 | Becker et al. |
| 2019/0079740 A1 | 3/2019 | Sharma et al. |
| 2019/0088106 A1 | 3/2019 | Grundstrom |
| 2019/0094824 A1 | 3/2019 | Xie et al. |
| 2019/0094827 A1 | 3/2019 | Park et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0207866 A1 | 7/2019 | Pathak et al. |
| 2019/0208285 A1 | 7/2019 | Chapman et al. |
| 2019/0250575 A1 | 8/2019 | Jonsson |
| 2019/0268178 A1 | 8/2019 | Fairweather et al. |
| 2019/0306024 A1 | 10/2019 | Petria et al. |
| 2019/0310979 A1 | 10/2019 | Masuzaki et al. |
| 2019/0356502 A1 | 11/2019 | Nair et al. |
| 2019/0356550 A1 | 11/2019 | Stanciu et al. |
| 2019/0373308 A1* | 12/2019 | Skupin .................... H04L 67/02 |
| 2019/0377306 A1 | 12/2019 | Harvey |
| 2020/0033821 A1 | 1/2020 | Krishnamurthy et al. |
| 2020/0125043 A1 | 4/2020 | Park |
| 2020/0133978 A1 | 4/2020 | Ramamurti et al. |
| 2020/0162354 A1 | 5/2020 | Drees et al. |
| 2020/0167148 A1 | 5/2020 | Park et al. |
| 2020/0183660 A1 | 6/2020 | Lucas et al. |
| 2020/0226156 A1 | 7/2020 | Borra et al. |
| 2020/0226916 A1 | 7/2020 | Lim et al. |
| 2020/0285203 A1 | 9/2020 | Thakur et al. |
| 2020/0327371 A1 | 10/2020 | Sharma et al. |
| 2020/0336328 A1 | 10/2020 | Harvey |
| 2020/0348632 A1 | 11/2020 | Harvey |

(56) References Cited

U.S. PATENT DOCUMENTS

| | | | |
|---|---|---|---|
| 2020/0370773 A1 | 11/2020 | Li et al. | |
| 2020/0372174 A1 | 11/2020 | Schenkein | |
| 2020/0382602 A1 | 12/2020 | Barry et al. | |
| 2020/0387576 A1 | 12/2020 | Brett et al. | |
| 2020/0396208 A1 | 12/2020 | Brett et al. | |
| 2021/0003308 A1 | 1/2021 | Venne | |
| 2021/0042299 A1 | 2/2021 | Migliori | |
| 2021/0043221 A1 | 2/2021 | Yelchuru et al. | |
| 2021/0120556 A1* | 4/2021 | Segev | H04W 28/16 |
| 2021/0142650 A1 | 5/2021 | Darling et al. | |
| 2021/0144210 A1 | 5/2021 | Kolhapure et al. | |
| 2021/0191826 A1 | 6/2021 | Duraisingh et al. | |
| 2021/0200169 A1 | 7/2021 | Ploegert et al. | |
| 2021/0200807 A1 | 7/2021 | Ploegert et al. | |
| 2021/0204302 A1* | 7/2021 | Hareuveni | H04W 72/23 |
| 2021/0232369 A1 | 7/2021 | Sharma et al. | |
| 2021/0280034 A1 | 9/2021 | Wedig et al. | |
| 2021/0325070 A1 | 10/2021 | Endel et al. | |
| 2021/0326128 A1 | 10/2021 | Malladi et al. | |
| 2021/0342961 A1 | 11/2021 | Winter et al. | |
| 2021/0373509 A1 | 12/2021 | Borah et al. | |
| 2021/0373510 A1 | 12/2021 | Borah et al. | |
| 2021/0381711 A1 | 12/2021 | Harvey et al. | |
| 2021/0381712 A1 | 12/2021 | Harvey et al. | |
| 2021/0382445 A1 | 12/2021 | Harvey et al. | |
| 2021/0382452 A1 | 12/2021 | Krishnan et al. | |
| 2021/0383041 A1 | 12/2021 | Harvey et al. | |
| 2021/0383042 A1 | 12/2021 | Harvey et al. | |
| 2021/0383200 A1 | 12/2021 | Harvey et al. | |
| 2021/0383219 A1 | 12/2021 | Harvey et al. | |
| 2021/0383235 A1 | 12/2021 | Harvey et al. | |
| 2021/0383236 A1 | 12/2021 | Harvey et al. | |
| 2021/0389739 A1 | 12/2021 | Nadumane et al. | |
| 2021/0389968 A1 | 12/2021 | Majewski et al. | |
| 2021/0390203 A1 | 12/2021 | Palanivel et al. | |
| 2022/0004445 A1 | 1/2022 | George et al. | |
| 2022/0019184 A1 | 1/2022 | Kan | |
| 2022/0066402 A1 | 3/2022 | Harvey et al. | |
| 2022/0066405 A1 | 3/2022 | Harvey | |
| 2022/0066432 A1 | 3/2022 | Harvey et al. | |
| 2022/0066434 A1 | 3/2022 | Harvey et al. | |
| 2022/0066528 A1 | 3/2022 | Harvey et al. | |
| 2022/0066722 A1 | 3/2022 | Harvey et al. | |
| 2022/0066754 A1 | 3/2022 | Harvey et al. | |
| 2022/0066761 A1 | 3/2022 | Harvey et al. | |
| 2022/0067226 A1 | 3/2022 | Harvey et al. | |
| 2022/0067227 A1 | 3/2022 | Harvey et al. | |
| 2022/0067230 A1 | 3/2022 | Harvey et al. | |
| 2022/0069863 A1 | 3/2022 | Harvey et al. | |
| 2022/0070293 A1 | 3/2022 | Harvey et al. | |
| 2022/0092500 A1 | 3/2022 | Drees et al. | |
| 2022/0121965 A1 | 4/2022 | Chatterji et al. | |
| 2022/0137936 A1 | 5/2022 | Lucas et al. | |
| 2022/0138684 A1 | 5/2022 | Harvey | |
| 2022/0147000 A1 | 5/2022 | Cooley et al. | |
| 2022/0150124 A1 | 5/2022 | Cooley et al. | |
| 2022/0171995 A1 | 6/2022 | Balasubramanian et al. | |
| 2022/0179479 A1 | 6/2022 | Ricart et al. | |
| 2022/0179646 A1 | 6/2022 | Fox | |
| 2022/0179683 A1 | 6/2022 | Verma et al. | |
| 2022/0182278 A1 | 6/2022 | Vangapalli et al. | |
| 2022/0188434 A1 | 6/2022 | Liu et al. | |
| 2022/0191092 A1 | 6/2022 | Luscher et al. | |
| 2022/0215264 A1 | 7/2022 | Harvey et al. | |
| 2022/0373982 A1 | 11/2022 | Chakraborty et al. | |
| 2023/0010757 A1 | 1/2023 | Preciado | |
| 2023/0034535 A1 | 2/2023 | Setlur et al. | |
| 2023/0071312 A1 | 3/2023 | Preciado et al. | |
| 2023/0076011 A1 | 3/2023 | Preciado et al. | |
| 2023/0083703 A1 | 3/2023 | Meiners | |
| 2023/0244996 A1 | 8/2023 | Kumar et al. | |
| 2023/0284063 A1* | 9/2023 | Kaliaperumal | H04W 16/14 370/329 |
| 2023/0350372 A1* | 11/2023 | Krishnan | G05B 19/0421 |
| 2023/0367559 A1 | 11/2023 | Sharma et al. | |
| 2023/0408993 A1 | 12/2023 | Krishnamurthy et al. | |
| 2024/0089302 A1 | 3/2024 | Chakraborty et al. | |
| 2024/0107568 A1* | 3/2024 | Bandaru | H04W 72/0453 |
| 2024/0196384 A1* | 6/2024 | Clancy | H04W 72/0453 |
| 2024/0302824 A1 | 9/2024 | Alaghehband et al. | |
| 2024/0349067 A1* | 10/2024 | Srinivasan | H04W 72/02 |
| 2024/0373239 A1* | 11/2024 | Furuichi | H04L 1/20 |

FOREIGN PATENT DOCUMENTS

| | | |
|---|---|---|
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 268 821 B1 | 1/2018 |
| EP | 3 324 306 A1 | 5/2018 |
| EP | 4 226 263 A1 | 8/2023 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2020/061621 A1 | 4/2020 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

Balaji et al, "Brick: Metadata schema for portable smart building applications," Applied Energy, Sep. 15, 2018, 3 pages, (Abstract).

Balaji et al, "Demo Abstract: Portable Queries Using the Brick Schema for Building Applications," BuildSys '16, Palo Alto, CA, USA, Nov. 16-17, 2016 (2 pages).

Balaji, B. et al., "Brick: Towards a Unified Metadata Schema For Buildings." BuildSys '16, Palo Alto, CA, USA, Nov. 16-17, 2016 (10 pages).

Bhattacharya et al., "Short Paper: Analyzing Metadata Schemas for Buildings—The Good, The Bad and The Ugly," BuildSys '15, Seoul, South Korea, Nov. 4-5, 2015 (4 pages).

Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).

Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).

(56) References Cited

OTHER PUBLICATIONS

Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation con-

(56) References Cited

OTHER PUBLICATIONS trol and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Zhou, Q. et al., "Knowledge-infused and Consistent Complex Event Processing over Real-time and Persistent Streams," Further Generation Computer Systems, 2017, 76 (pp. 391-406).
International Search Report and Written Opinion on PCT Appl. No. PCT/US2022/054323 dated May 4, 2023 (16 pages).
U.S. Appl. No. 17/566,029, Not Available, Passivelogic, Inc.
U.S. Appl. No. 17/567,275, Not Available, Passivelogic, Inc.
U.S. Appl. No. 17/722,115, Not Available, Passivelogic, Inc.
International Search Report and Written Opinion on PCT Application No. PCT/US2023/034166 dated Jan. 24, 2024 (9 pages).
European Office Action on EP Appl. No. 22856934.9 dated Apr. 24, 2025 (4 pages).

* cited by examiner

BUILDING PLATFORM CHIP FOR DIGITAL TWINS

CROSS-REFERENCE TO RELATED PATENT APPLICATIONS

This application claims the benefit of, and priority to, U.S. Provisional Application No. 63/299,772 filed Jan. 14, 2022 and U.S. Provisional Application No. 63/411,540 filed Sep. 29, 2022. This application is a continuation-in-part of U.S. patent application Ser. No. 17/710,775 filed Mar. 31, 2022 which claims the benefit of and priority to U.S. Provisional Patent Application No. 63/296,078 filed Jan. 3, 2022. The entirety of these patent applications is incorporated by reference herein.

BACKGROUND

The present disclosure relates generally to buildings and building management system (BMS) for the buildings. The present disclosure relates more particularly to digital twin systems for buildings.

SUMMARY

One aspect of the present disclosure is a method. The method can include activating a building platform chip integrated into a building device of a building and coupled with a processing circuit of the building device. The method can include retrieving, by the building platform chip, first data from the processing circuit of the building device through communication with the processing circuit. The method can include generating, by the building platform chip, second data to cause a digital twin of the building device to be constructed.

In some embodiments, the method can include establishing, by the building platform chip, a communication link between the building platform chip and the processing circuit of the building device. The method can include retrieving, by the building platform chip, the first data from the processing circuit through communication with the processing circuit.

In some embodiments, the method includes establishing, by the building platform chip, a communication link between the building platform chip and a building platform. In some embodiments, the method includes transmitting, by the building platform chip, the first data to the building platform through the communication link to construct the digital twin.

In some embodiments, the method includes integrating the building platform chip into the building device by inserting the building platform chip into a receiver of the building device to electrically couple the building platform chip to the processing circuit or mounting the building platform chip to a circuit board of the building device to electrically couple the building platform chip to the processing circuit via at least one electrical trace.

In some embodiments, the digital twin includes a building graph including a plurality of nodes and a plurality of edges between the plurality of nodes. In some embodiments, the first data includes indications of a plurality of entities and indications of a plurality of relationships between the plurality of entities. In some embodiments, the method includes constructing the building graph to include the plurality of nodes representing the plurality of entities and the plurality of edges between the plurality of nodes representing the plurality of relationships between the plurality of entities.

In some embodiments, the method includes constructing, by the building platform chip, the digital twin based on the first data defining the digital twin. In some embodiments, the method includes transmitting, by the building platform chip, the digital twin to a building platform responsive to construction of the digital twin.

In some embodiments, the method includes transmitting, by the building platform chip, the first data to a building platform, the building platform to construct the digital twin based on the first data and store the digital twin.

In some embodiments, the first data is at least one of entities comprising at least one of an indication of the building device, an indication of a point of the building device, an indication of a space that the building device is located in, or an indication of another building device related to the building device, event data describing an event generated by the building device, or relationships between the entities.

In some embodiments, the method includes receiving new data defining the digital twin and updating the digital twin of the building device through transmitting the new data defining the digital twin to a building platform.

Another aspect of the present disclosure is a building device. The building device can include a processing circuit. The building device can include a building platform chip integrated within the building device and coupled to the processing circuit of the building device. The building platform chip can be configured to retrieve first data from the processing circuit of the building device through communication with the processing circuit and generate second data to cause a digital twin of the building device to be constructed.

In some embodiments, the building platform chip configured to establish a communication link between the building platform chip and the processing circuit of the building device in response to an integration of a building platform into the building device. In some embodiments, the building platform chip is configured to retrieve the first data from the processing circuit through communication with the processing circuit.

In some embodiments, the building platform chip configured to establish a communication link between the building platform chip and a building platform. In some embodiments, the building platform chip is configured to transmit the first data to the building platform through the communication link to construct the digital twin.

In some embodiments, the digital twin includes a building graph comprising a plurality of nodes and a plurality of edges between the plurality of nodes. In some embodiments, the first data includes indications of a plurality of entities and indications of a plurality of relationships between the plurality of entities. In some embodiments, the building platform chip configured to construct the building graph to include the plurality of nodes representing the plurality of entities and the plurality of edges between the plurality of nodes representing the plurality of relationships between the plurality of entities.

In some embodiments, the building platform chip configured to construct the digital twin based on the first data defining the digital twin. In some embodiments, the building platform chip is configured to transmit the digital twin to a building platform responsive to construction of the digital twin.

In some embodiments, the building platform chip configured to transmit the first data defining the digital twin to a building platform, the building platform to construct the digital twin based on the first data and store the digital twin.

In some embodiments, the first data is at least one of entities comprising at least one of an indication of the building device, an indication of a point of the building device, an indication of a space that the building device is located in, or an indication of another building device related to the building device, event data describing an event generated by the building device, or relationships between the entities.

Another aspect of the present disclosure is a building platform chip. The building platform chip is configured to integrate within a building device and couple to a processing circuit of the building device. The building platform chip is configured to retrieve first data from the processing circuit of the building device through communication with the processing circuit. The building platform chip is configured to generate second data to cause a digital twin of the building device to be constructed.

In some embodiments, the building platform chip is configured to establish a communication link between the building platform chip and the processing circuit of the building device in response to an activation of the building platform chip. In some embodiments, the building platform chip is configured to retrieve the first data from the processing circuit through communication with the processing circuit.

In some embodiments, the building platform chip is configured to establish a communication link between the building platform chip and a building platform. In some embodiments, the building platform chip is configured to transmit the first data to the building platform through the communication link to construct the digital twin.

In some embodiments, the digital twin includes a building graph comprising a plurality of nodes and a plurality of edges between the plurality of nodes. In some embodiments, the first data includes indications of a plurality of entities and indications of a plurality of relationships between the plurality of entities. In some embodiments, the building platform chip is configured to construct the building graph to include the plurality of nodes representing the plurality of entities and the plurality of edges between the plurality of nodes representing the plurality of relationships between the plurality of entities.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Referring generally to the FIGURES, systems and methods for implementing processing within BMS devices is shown. In some embodiments, a building platform chip, a system on a chip, or a circuit card can be integrated, installed, or combined into or within a BMS device. The building platform chip can include a device interface and a data platform interface. The building platform chip can include a processor to determine digital twin data, e.g., relationships and/or entities that define a digital twin, associated with the BMS device. The building platform chip can facilitate communications to a building data platform and provide the relationship/entity information associated with the BMS device to the building data platform. Advantageously, the processor is provided within a BMS device as an integrated circuit package or system on a chip that may decrease computing power and/or latency within off-premise cloud processing. The systems and methods described herein can be utilized in the various BMS devices and networks discussed in the U.S. patent application Ser. No. 15/473,496 filed Mar. 29, 2017 (now U.S. Pat. No. 10,706,375), the entire disclosure of which is incorporated by reference herein. The present disclosure relates to using a processing circuit to determine and provide entity and relationship data associated with a BMS device to a building data platform. Furthermore, the edge and digital twin functions described in U.S. Provisional Application No. 63/411,540 filed Sep. 29, 2022, U.S. patent application Ser. No. 17/710,775 filed Mar. 31, 2022, and U.S. Provisional Patent Application No. 63/296,078 filed Jan. 3, 2022 can be implemented by the integrated circuit package or chip described herein.

Figure 1:
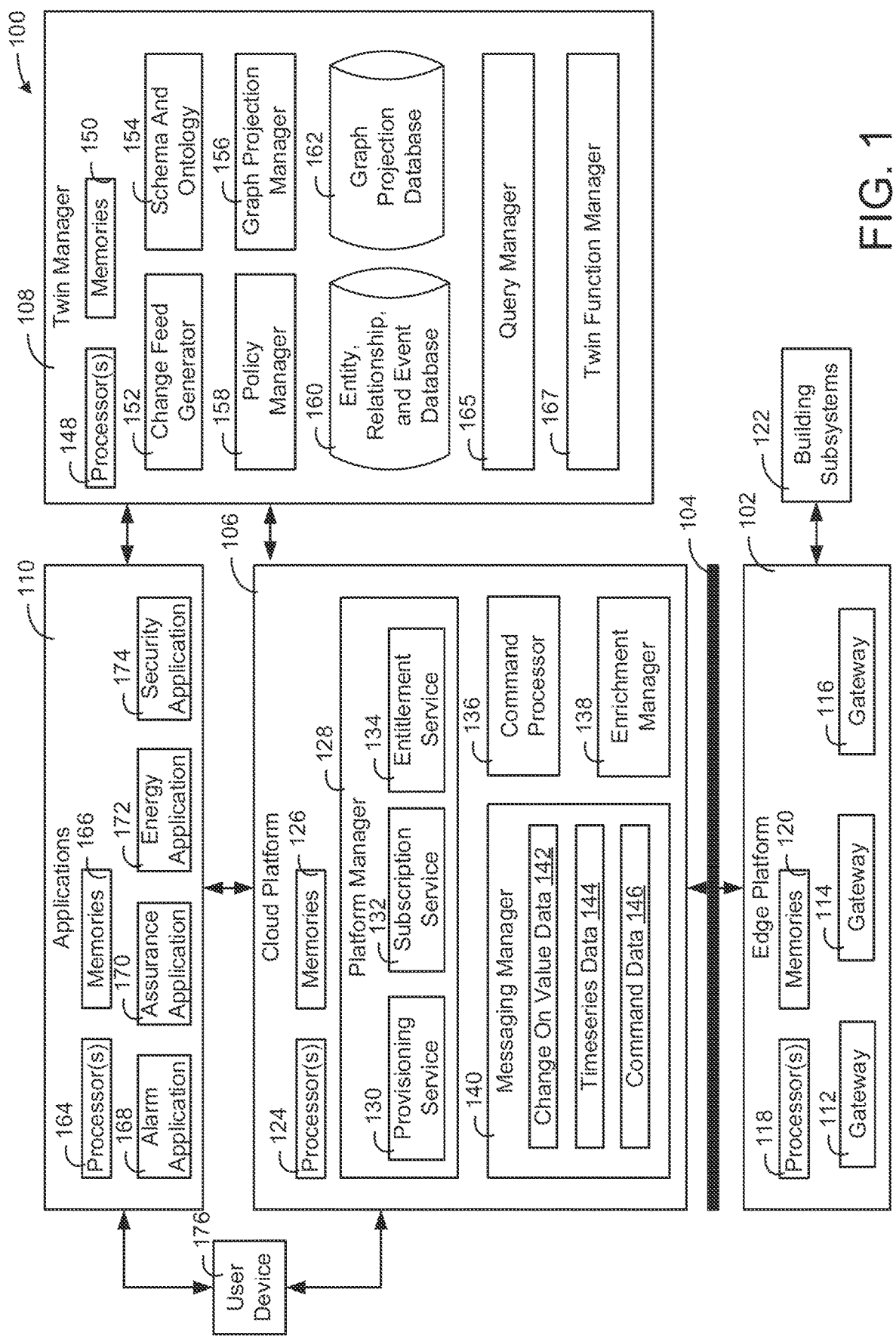
FIG. 1 is a block diagram of a building data platform including an edge platform, a cloud platform, and a twin manager, according to an exemplary embodiment.

Referring now to FIG. 1, a building data platform 100 including an edge platform 102, a cloud platform 106, and a twin manager 108 are shown, according to some embodiments. The edge platform 102, the cloud platform 106, and the twin manager 108 can each be separate services deployed on the same or different computing systems. In some embodiments, the cloud platform 106 and the twin manager 108 are implemented in off premises computing systems, e.g., outside a building. The edge platform 102 can be implemented on-premises, e.g., within or near the building.

The building data platform 100 includes applications 110. The applications 110 can be various applications that operate to manage the building subsystems 122. The applications 110 can be remote or on-premises applications that run on various computing systems. The applications 110 can include an alarm application 168 configured to manage alarms for the building subsystems 122. The applications 110 include an assurance application 170 that implements assurance services for the building subsystems 122. In some embodiments, the applications 110 include an energy application 172 configured to manage the energy usage of the building subsystems 122. The applications 110 include a security application 174 configured to manage security systems of the building.

In some embodiments, the applications 110 and/or the cloud platform 106 interacts with a user device 176. In some embodiments, a component or an entire application of the applications 110 runs on the user device 176. The user device 176 may be a laptop computer, a desktop computer, a smartphone, a tablet, and/or any other device with an input interface (e.g., touch screen, mouse, keyboard, etc.) and an output interface (e.g., a speaker, a display, etc.).

The applications 110, the twin manager 108, the cloud platform 106, and the edge platform 102 can be implemented on one or more computing systems, e.g., on processors and/or memory devices. For example, the edge platform 102 includes processor(s) 118 and memories 120, the cloud platform 106 includes processor(s) 124 and memories 126, the applications 110 include processor(s) 164 and memories 166, and the twin manager 108 includes processor(s) 148 and memories 150.

The processors can be a general purpose or specific purpose processor, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.).

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

The edge platform 102 can be configured to provide connection to the building subsystems 122. The edge platform 102 can receive messages from the building subsystems 122 and/or deliver messages to the building subsystems 122. The edge platform 102 includes one or multiple gateways, e.g., the gateways 112-116. The gateways 112-116 can act as a gateway between the cloud platform 106 and the building subsystems 122. The gateways 112-116 can be the gateways described in U.S. Provisional Patent Application No. 62/951,897 filed Dec. 20, 2019, the entirety of which is incorporated by reference herein. In some embodiments, the applications 110 can be deployed on the edge platform 102. In this regard, lower latency in management of the building subsystems 122 can be realized.

The edge platform 102 can be connected to the cloud platform 106 via a network 104. The network 104 can communicatively couple the devices and systems of building data platform 100. In some embodiments, the network 104 is at least one of and/or a combination of a Wi-Fi network, a wired Ethernet network, a ZigBee network, a Bluetooth network, and/or any other wireless network. The network 104 may be a local area network or a wide area network (e.g., the Internet, a building WAN, etc.) and may use a variety of communications protocols (e.g., BACnet, IP, LON, etc.). The network 104 may include routers, modems, servers, cell towers, satellites, and/or network switches. The network 104 may be a combination of wired and wireless networks.

The cloud platform 106 can be configured to facilitate communication and routing of messages between the applications 110, the twin manager 108, the edge platform 102, and/or any other system. The cloud platform 106 can include a platform manager 128, a messaging manager 140, a command processor 136, and an enrichment manager 138. In some embodiments, the cloud platform 106 can facilitate messaging between the building data platform 100 via the network 104.

The messaging manager 140 can be configured to operate as a transport service that controls communication with the building subsystems 122 and/or any other system, e.g., managing commands to devices (C2D), commands to connectors (C2C) for external systems, commands from the device to the cloud (D2C), and/or notifications. The messaging manager 140 can receive different types of data from the applications 110, the twin manager 108, and/or the edge platform 102. The messaging manager 140 can receive change on value data 142, e.g., data that indicates that a value of a point has changed. The messaging manager 140 can receive timeseries data 144, e.g., a time correlated series of data entries each associated with a particular time stamp. Furthermore, the messaging manager 140 can receive command data 146. All of the messages handled by the cloud platform 106 can be handled as an event, e.g., the data 142-146 can each be packaged as an event with a data value occurring at a particular time (e.g., a temperature measurement made at a particular time).

The cloud platform 106 includes a command processor 136. The command processor 136 can be configured to receive commands to perform an action from the applications 110, the building subsystems 122, the user device 176, etc. The command processor 136 can manage the commands, determine whether the commanding system is authorized to perform the particular commands, and communicate the commands to the commanded system, e.g., the building subsystems 122 and/or the applications 110. The commands could be a command to change an operational setting that control environmental conditions of a building, a command to run analytics, etc.

The cloud platform 106 includes an enrichment manager 138. The enrichment manager 138 can be configured to enrich the events received by the messaging manager 140. The enrichment manager 138 can be configured to add contextual information to the events. The enrichment manager 138 can communicate with the twin manager 108 to retrieve the contextual information. In some embodiments, the contextual information is an indication of information related to the event. For example, if the event is a timeseries temperature measurement of a thermostat, contextual information such as the location of the thermostat (e.g., what room), the equipment controlled by the thermostat (e.g., what VAV), etc. can be added to the event. In this regard, when a consuming application, e.g., one of the applications 110 receives the event, the consuming application can operate based on the data of the event, the temperature measurement, and also the contextual information of the event.

The enrichment manager 138 can solve a problem that when a device produces a significant amount of information, the information may contain simple data without context. An example might include the data generated when a user scans a badge at a badge scanner of the building subsystems 122. This physical event can generate an output event including such information as "DeviceBadgeScannerID," "BadgeID," and/or "Date/Time." However, if a system sends this data to a consuming application, e.g., Consumer A and a Consumer B, each customer may need to call the building data platform knowledge service to query information with queries such as, "What space, build, floor is that badge scanner in?" or "What user is associated with that badge?"

By performing enrichment on the data feed, a system can be able to perform inferences on the data. A result of the enrichment may be transformation of the message "DeviceBadgeScannerId, BadgeId, Date/Time," to "Region, Building, Floor, Asset, DeviceId, BadgeId, UserName, EmployeeId, Date/Time Scanned." This can be a significant optimization, as a system can reduce the number of calls by 1/n, where n is the number of consumers of this data feed.

By using this enrichment, a system can also have the ability to filter out undesired events. If there are 100 building in a campus that receive 100,000 events per building each hour, but only 1 building is actually commissioned, only 1/10 of the events are enriched. By looking at what events are enriched and what events are not enriched, a system can do traffic shaping of forwarding of these events to reduce the cost of forwarding events that no consuming application wants or reads.

An example of an event received by the enrichment manager 138 may be:

```
{
    "id": "someguid",
    "eventType": "Device_Heartbeat",
    "eventTime": "2018-01-27T00:00:00+00:00"
    "eventValue": 1,
    "deviceID": "someguid"
}
```

An example of an enriched event generated by the enrichment manager 138 may be:

```
{
    "id": "someguid",
    "eventType": "Device_Heartbeat",
    "eventTime": "2018-01-27T00:00:00+00:00"
    "eventValue": 1,
    "deviceID": "someguid",
    "buildingName": "Building-48",
    "buildingID": "SomeGuid",
    "panelID": "SomeGuid",
    "panelName": "Building-48-Panel-13",
    "cityID": 371,
    "cityName": "Milwaukee",
    "stateID": 48,
    "stateName": "Wisconsin (WI)",
    "countryID": 1,
    "countryName": "United States"
}
```

By receiving enriched events, an application of the applications 110 can be able to populate and/or filter what events are associated with what areas. Furthermore, user interface generating applications can generate user interfaces that include the contextual information based on the enriched events.

The cloud platform 106 includes a platform manager 128. The platform manager 128 can be configured to manage the users and/or subscriptions of the cloud platform 106. For example, what subscribing building, user, and/or tenant utilizes the cloud platform 106. The platform manager 128 includes a provisioning service 130 configured to provision the cloud platform 106, the edge platform 102, and the twin manager 108. The platform manager 128 includes a subscription service 132 configured to manage a subscription of the building, user, and/or tenant while the entitlement service 134 can track entitlements of the buildings, users, and/or tenants.

The twin manager 108 can be configured to manage and maintain a digital twin. The digital twin can be a digital representation of the physical environment, e.g., a building, or a portion thereof. The twin manager 108 can include a change feed generator 152, a schema and ontology 154, a projection manager 156, a policy manager 158, an entity, relationship, and event database 160, and a graph projection database 162.

The graph projection manager 156 can be configured to construct graph projections and store the graph projections in the graph projection database 162. Entities, relationships, and events can be stored in the database 160. The graph projection manager 156 can retrieve entities, relationships, and/or events from the database 160 and construct a graph projection based on the retrieved entities, relationships and/or events. In some embodiments, the database 160 includes an entity-relationship collection for multiple subscriptions.

In some embodiment, the graph projection manager 156 generates a graph projection for a particular user, application, subscription, and/or system. In this regard, the graph projection can be generated based on policies for the particular user, application, and/or system in addition to an ontology specific for that user, application, and/or system. In this regard, an entity could request a graph projection and the graph projection manager 156 can be configured to generate the graph projection for the entity based on policies and an ontology specific to the entity. The policies can indicate what entities, relationships, and/or events the entity has access to. The ontology can indicate what types of relationships between entities the requesting entity expects to see, e.g., floors within a building, devices within a floor, etc. Another requesting entity may have an ontology to see devices within a building and applications for the devices within the graph.

The graph projections generated by the graph projection manager 156 and stored in the graph projection database 162 can be a knowledge graph and is an integration point. For example, the graph projections can represent floor plans and systems associated with each floor. Furthermore, the graph projections can include events, e.g., telemetry data of the building subsystems 122. The graph projections can show application services as nodes and API calls between the services as edges in the graph. The graph projections can illustrate the capabilities of spaces, users, and/or devices. The graph projections can include indications of the building subsystems 122, e.g., thermostats, cameras, VAVs, etc. The graph projection database 162 can store graph projections that keep up a current state of a building.

In some embodiments the enrichment manager 138 can use a graph projection of the graph projection database 162 to enrich events. In some embodiments, the enrichment manager 138 can identify nodes and relationships that are associated with, and are pertinent to, the device that generated the event. For example, the enrichment manager 138 could identify a thermostat generating a temperature measurement event within the graph. The enrichment manager 138 can identify relationships between the thermostat and spaces, e.g., a zone that the thermostat is located in. The enrichment manager 138 can add an indication of the zone to the event.

Furthermore, the command processor 136 can be configured to utilize the graph projections to command the building subsystems 122. The command processor 136 can identify a policy for a commanding entity within the graph projection to determine whether the commanding entity has the ability to make the command. For example, the command processor 136, before allowing a user to make a command, determine, based on the graph projection database 162, to determine that the user has a policy to be able to make the command.

In some embodiments, the policies can be conditional based policies. For example, the building data platform 100 can apply one or more conditional rules to determine whether a particular system has the ability to perform an action. In some embodiments, the rules analyze a behavioral based biometric. For example, a behavioral based biometric can indicate normal behavior and/or normal behavior rules for a system. In some embodiments, when the building data platform 100 determines, based on the one or more conditional rules, that an action requested by a system does not match a normal behavior, the building data platform 100 can deny the system the ability to perform the action and/or request approval from a higher level system.

For example, a behavior rule could indicate that a user has access to log into a system with a particular IP address between 8 A.M. through 5 P.M. However, if the user logs in to the system at 7 P.M., the building data platform 100 may contact an administrator to determine whether to give the user permission to log in.

The change feed generator 152 can be configured to generate a feed of events that indicate changes to the digital twin, e.g., to the graph. The change feed generator 152 can track changes to the entities, relationships, and/or events of the graph. For example, the change feed generator 152 can detect an addition, deletion, and/or modification of a node or edge of the graph, e.g., changing the entities, relationships, and/or events within the database 160. In response to detecting a change to the graph, the change feed generator 152 can generate an event summarizing the change. The event can indicate what nodes and/or edges have changed and how the nodes and edges have changed. The events can be posted to a topic by the change feed generator 152.

The change feed generator 152 can implement a change feed of a knowledge graph. The building data platform 100 can implement a subscription to changes in the knowledge graph. When the change feed generator 152 posts events in the change feed, subscribing systems or applications can receive the change feed event. By generating a record of all changes that have happened, a system can stage data in different ways, and then replay the data back in whatever order the system wishes. This can include running the changes sequentially one by one and/or by jumping from one major change to the next. For example, to generate a graph at a particular time, all change feed events up to the particular time can be used to construct the graph.

The change feed can track the changes in each node in the graph and the relationships related to them, in some embodiments. If a user wants to subscribe to these changes and the user has proper access, the user can simply submit a web API call to have sequential notifications of each change that happens in the graph. A user and/or system can replay the changes one by one to reinstitute the graph at any given time slice. Even though the messages are "thin" and only include notification of change and the reference "id/seq id," the change feed can keep a copy of every state of each node and/or relationship so that a user and/or system can retrieve those past states at any time for each node. Furthermore, a consumer of the change feed could also create dynamic "views" allowing different "snapshots" in time of what the graph looks like from a particular context. While the twin manager 108 may contain the history and the current state of the graph based upon schema evaluation, a consumer can retain a copy of that data, and thereby create dynamic views using the change feed.

The schema and ontology 154 can define the message schema and graph ontology of the twin manager 108. The message schema can define what format messages received by the messaging manager 140 should have, e.g., what parameters, what formats, etc. The ontology can define graph projections, e.g., the ontology that a user wishes to view. For example, various systems, applications, and/or users can be associated with a graph ontology. Accordingly, when the graph projection manager 156 generates an graph projection for a user, system, or subscription, the graph projection manager 156 can generate a graph projection according to the ontology specific to the user. For example, the ontology can define what types of entities are related in what order in a graph, for example, for the ontology for a subscription of "Customer A," the graph projection manager 156 can create relationships for a graph projection based on the rule:

Region←→Building←→Floor←→Space←→Asset

For the ontology of a subscription of "Customer B," the graph projection manager 156 can create relationships based on the rule:

Building←→Floor←→Asset

The policy manager 158 can be configured to respond to requests from other applications and/or systems for policies. The policy manager 158 can consult a graph projection to determine what permissions different applications, users, and/or devices have. The graph projection can indicate various permissions that different types of entities have and the policy manager 158 can search the graph projection to identify the permissions of a particular entity. The policy manager 158 can facilitate fine grain access control with user permissions. The policy manager 158 can apply permissions across a graph, e.g., if "user can view all data associated with floor 1" then they see all subsystem data for that floor, e.g., surveillance cameras, HVAC devices, fire detection and response devices, etc. The functionality of system 100 can be or include any of the systems and/or methods described in U.S. Patent Publication No. 2021/0200169 published Jul. 1, 2021 and filed Dec. 28, 2020, the entire disclosure of which is incorporated herein in its entirety.

Figure 2:
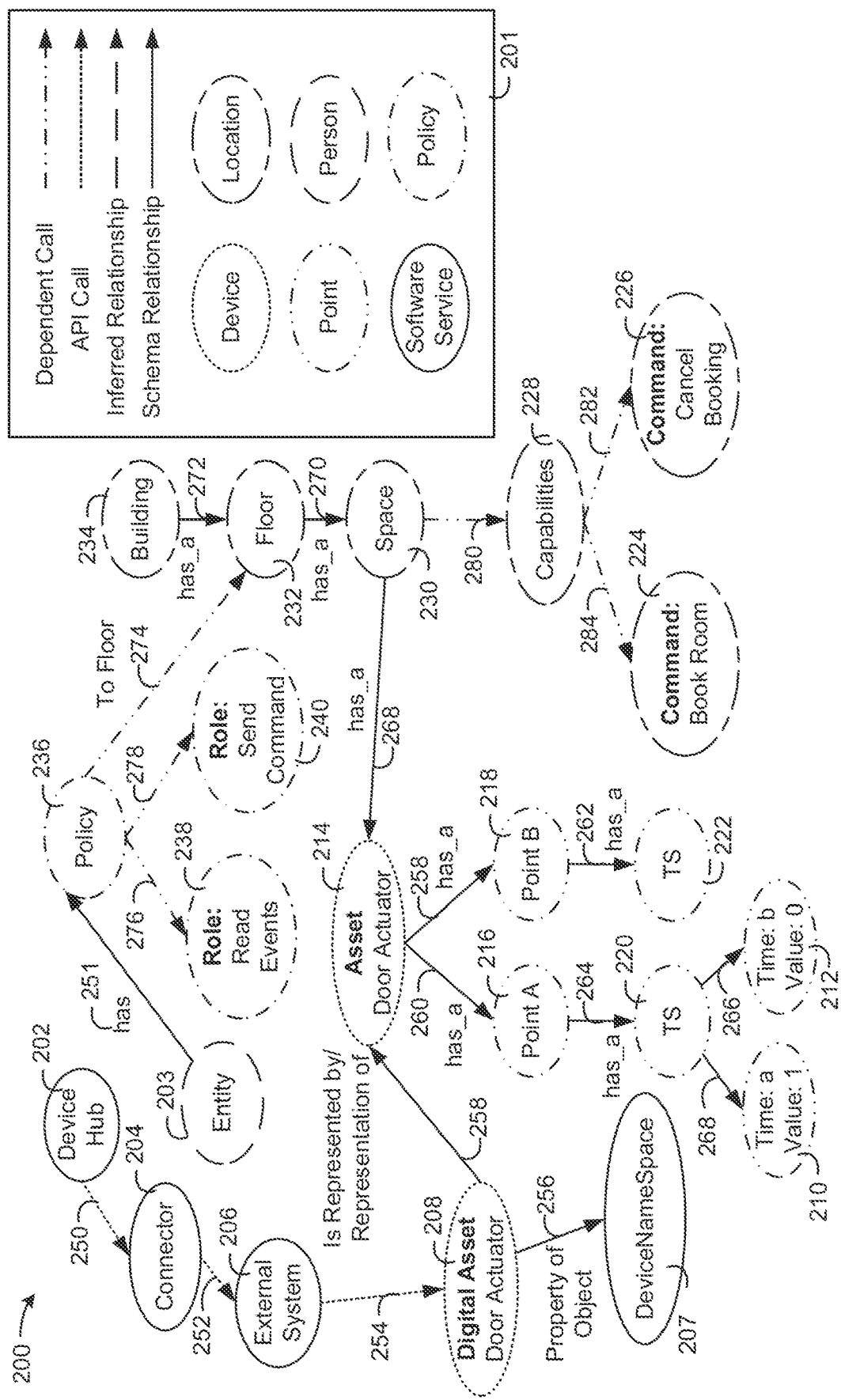
FIG. 2 is a graph projection of the twin manager of FIG. 1 including application programming interface (API) data, capability data, policy data, and services, according to an exemplary embodiment.

Referring now to FIG. 2, a graph projection 200 of the twin manager 108 including application programming interface (API) data, capability data, policy data, and services is shown, according to an exemplary embodiment. The graph projection 200 includes nodes 202-240 and edges 250-272. The nodes 202-240 and the edges 250-272 are defined according to the key 201. The nodes 202-240 represent different types of entities, devices, locations, points, persons, policies, and software services (e.g., API services). The edges 250-272 represent relationships between the nodes 202-240, e.g., dependent calls, API calls, inferred relationships, and schema relationships (e.g., BRICK relationships).

The graph projection 200 includes a device hub 202 which may represent a software service that facilitates the communication of data and commands between the cloud platform 106 and a device of the building subsystems 122, e.g., door actuator 214. The device hub 202 is related to a connector 204, an external system 206, and a digital asset "Door Actuator" 208 by edge 250, edge 252, and edge 254.

The cloud platform 106 can be configured to identify the device hub 202, the connector 204, the external system 206 related to the door actuator 214 by searching the graph projection 200 and identifying the edges 250-254 and edge 258. The graph projection 200 includes a digital representation of the "Door Actuator," node 208. The digital asset "Door Actuator" 208 includes a "DeviceNameSpace" represented by node 207 and related to the digital asset "Door Actuator" 208 by the "Property of Object" edge 256.

The "Door Actuator" 214 has points and timeseries. The "Door Actuator" 214 is related to "Point A" 216 by a "has_a" edge 260. The "Door Actuator" 214 is related to "Point B" 218 by a "has_A" edge 258. Furthermore, timeseries associated with the points A and B are represented by nodes "TS" 220 and "TS" 222. The timeseries are related to the points A and B by "has_a" edge 264 and "has_a" edge 262. The timeseries "TS" 220 has particular samples, sample 210 and 212 each related to "TS" 220 with edges 268 and 266 respectively. Each sample includes a time and a value. Each sample may be an event received from the door actuator that the cloud platform 106 ingests into the entity, relationship, and event database 160, e.g., ingests into the graph projection 200.

The graph projection 200 includes a building 234 representing a physical building. The building includes a floor represented by floor 232 related to the building 234 by the "has_a" edge from the building 234 to the floor 232. The floor has a space indicated by the edge "has_a" 270 between the floor 232 and the space 230. The space has particular capabilities, e.g., is a room that can be booked for a meeting, conference, private study time, etc. Furthermore, the booking can be canceled. The capabilities for the floor 232 are represented by capabilities 228 related to space 230 by edge 280. The capabilities 228 are related to two different commands, command "book room" 224 and command "cancel booking" 226 related to capabilities 228 by edge 284 and edge 282 respectively.

If the cloud platform 106 receives a command to book the space represented by the node, space 230, the cloud platform 106 can search the graph projection 200 for the capabilities for the 228 related to the space 230 to determine whether the cloud platform 106 can book the room.

In some embodiments, the cloud platform 106 could receive a request to book a room in a particular building, e.g., the building 234. The cloud platform 106 could search the graph projection 200 to identify spaces that have the capabilities to be booked, e.g., identify the space 230 based on the capabilities 228 related to the space 230. The cloud platform 106 can reply to the request with an indication of the space and allow the requesting entity to book the space 230.

The graph projection 200 includes a policy 236 for the floor 232. The policy 236 is related set for the floor 232 based on a "To Floor" edge 274 between the policy 236 and the floor 232. The policy 236 is related to different roles for the floor 232, read events 238 via edge 276 and send command 240 via edge 278. The policy 236 is set for the entity 203 based on has edge 251 between the entity 203 and the policy 236.

The twin manager 108 can identify policies for particular entities, e.g., users, software applications, systems, devices, etc. based on the policy 236. For example, if the cloud platform 106 receives a command to book the space 230. The cloud platform 106 can communicate with the twin manager 108 to verify that the entity requesting to book the space 230 has a policy to book the space. The twin manager 108 can identify the entity requesting to book the space as the entity 203 by searching the graph projection 200. Furthermore, the twin manager 108 can further identify the edge has 251 between the entity 203 and the policy 236 and the edge 1178 between the policy 236 and the command 240.

Furthermore, the twin manager 108 can identify that the entity 203 has the ability to command the space 230 based on the edge 1174 between the policy 236 and the edge 270 between the floor 232 and the space 230. In response to identifying the entity 203 has the ability to book the space 230, the twin manager 108 can provide an indication to the cloud platform 106.

Furthermore, if the entity makes a request to read events for the space 230, e.g., the sample 210 and the sample 212, the twin manager 108 can identify the edge has 251 between the entity 203 and the policy 236, the edge 1178 between the policy 236 and the read events 238, the edge 1174 between the policy 236 and the floor 232, the "has_a" edge 270 between the floor 232 and the space 230, the edge 268 between the space 230 and the door actuator 214, the edge 260 between the door actuator 214 and the point A 216, the "has_a" edge 264 between the point A 216 and the TS 220, and the edges 268 and 266 between the TS 220 and the samples 210 and 212 respectively.

Figure 3:
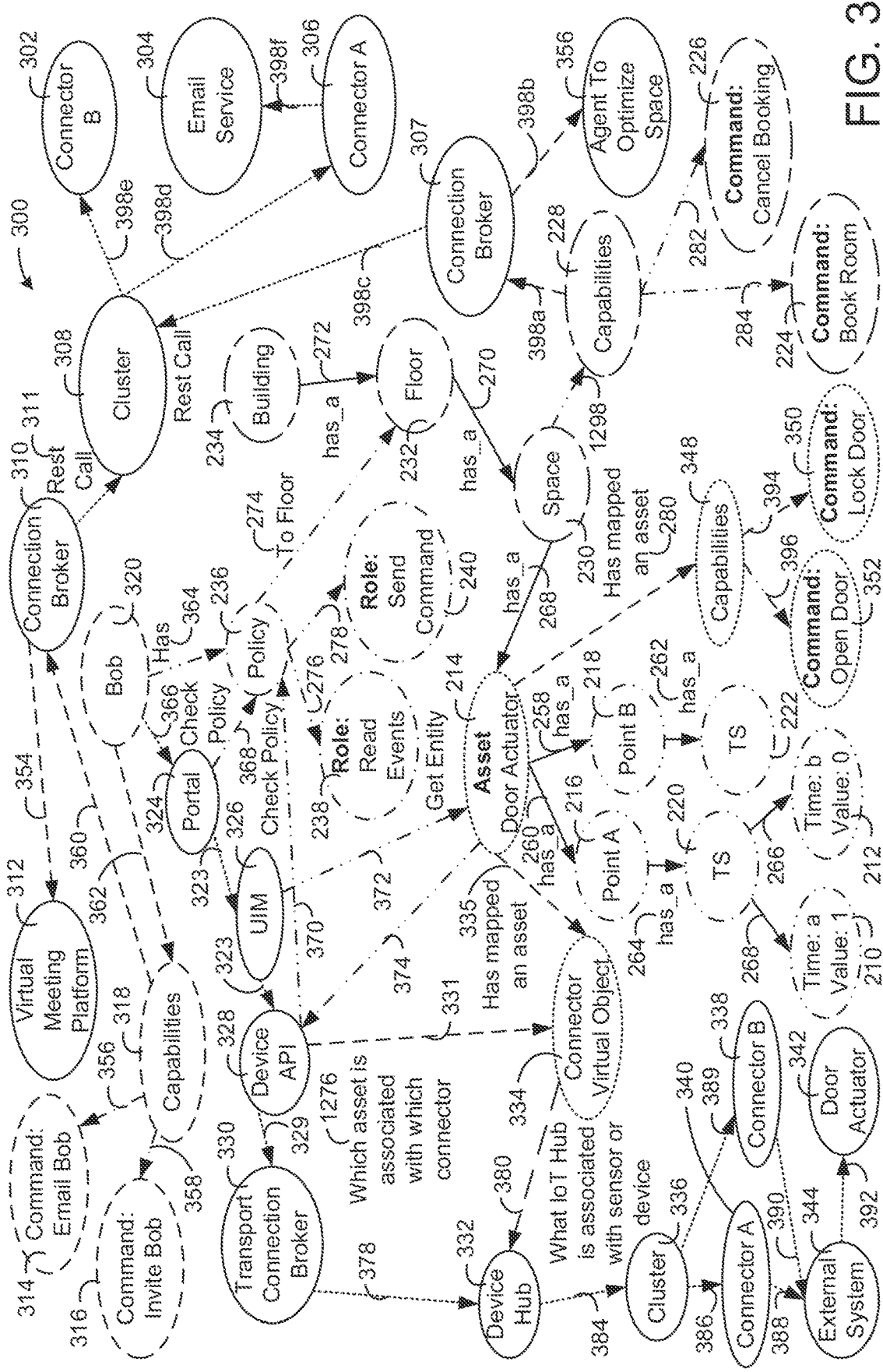
FIG. 3 is another graph projection of the twin manager of FIG. 1 including application programming interface (API) data, capability data, policy data, and services, according to an exemplary embodiment.

Referring now to FIG. 3, a graph projection 300 of the twin manager 108 including application programming interface (API) data, capability data, policy data, and services is shown, according to an exemplary embodiment. The graph projection 300 includes the nodes and edges described in the graph projection 200 of FIG. 2. The graph projection 300 includes a connection broker 307 related to capabilities 228 by edge 398a. The connection broker 307 can be a node representing a software application configured to facilitate a connection with another software application. In some embodiments, the cloud platform 106 can identify the system that implements the capabilities 228 by identifying the edge 398a between the capabilities 228 and the connection broker 307.

The connection broker 307 is related to an agent that optimizes a space 356 via edge 398b. The agent represented by the node 356 can book and cancel bookings for the space represented by the node 230 based on the edge 398b between the connection broker 307 and the node 356 and the edge 398a between the capabilities 228 and the connection broker 307.

The connection broker 307 is related to a cluster 308 by edge 398c. Cluster 308 is related to connector B 302 via edge 398e and connector A 306 via edge 398d. The connector A 306 is related to an external email service 304. A connection broker 310 is related to cluster 308 via an edge 311 representing a rest call that the connection broker represented by node 310 can make to the cluster represented by cluster 308.

The connection broker 310 is related to a virtual meeting platform 312 by an edge 354. The node 312 represents an external system that represents a virtual meeting platform. The connection broker represented by node 310 can represent a software component that facilitates a connection between the cloud platform 106 and the virtual meeting platform represented by node 312. When the cloud platform 106 needs to communicate with the virtual meeting platform represented by the node 312, the cloud platform 106 can identify the edge 354 between the connection broker 310 and the virtual meeting platform 312 and select the connection broker represented by the node 310 to facilitate communication with the virtual meeting platform represented by the node 312.

A capabilities node 318 can be connected to the connection broker 310 via edge 360. The capabilities 318 can be capabilities of the virtual meeting platform represented by the node 312 and can be related to the node 312 through the edge 360 to the connection broker 310 and the edge 354 between the connection broker 310 and the node 312. The capabilities 318 can define capabilities of the virtual meeting platform represented by the node 312. The node 320 is related to capabilities 318 via edge 362. The capabilities may be an invite bob command represented by node 316 and an email bob command represented by node 314. The capabilities 318 can be linked to a node 320 representing a user, Bob. The cloud platform 106 can facilitate email commands to send emails to the user Bob via the email service represented by the node 304. The node 304 is related to the connect a node 306 via edge 398f. Furthermore, the cloud platform 106 can facilitate sending an invite for a virtual meeting via the virtual meeting platform represented by the node 312 linked to the node 318 via the edge 358.

The node 320 for the user Bob can be associated with the policy 236 via the "has" edge 364. Furthermore, the node 320 can have a "check policy" edge 366 with a portal node 324. The device API node 328 has a check policy edge 370 to the policy node 236. The portal node 324 has an edge 368 to the policy node 236. The portal node 324 has an edge 323 to a node 326 representing a user input manager (UIM). The portal node 324 is related to the UIM node 326 via an edge 323. The UIM node 326 has an edge 323 to a device API node 328. The UIM node 326 is related to the door actuator node 214 via edge 372. The door actuator node 214 has an edge 374 to the device API node 328. The door actuator 214 has an edge 335 to the connector virtual object 334. The device hub 332 is related to the connector virtual object via edge 380. The device API node 328 can be an API for the door actuator 214. The connector virtual object 334 is related to the device API node 328 via the edge 331.

The device API node 328 is related to a transport connection broker 330 via an edge 329. The transport connection broker 330 is related to a device hub 332 via an edge 378. The device hub represented by node 332 can be a software component that hands the communication of data and commands for the door actuator 214. The cloud platform 106 can identify where to store data within the graph projection 300 received from the door actuator by identifying the nodes and edges between the points 216 and 218 and the device hub node 332. Similarly, the cloud platform 106 can identify commands for the door actuator that can be facilitated by the device hub represented by the node 332, e.g., by identifying edges between the device hub node 332 and an open door node 352 and an lock door node 350. The door actuator 114 has an edge "has mapped an asset" 280 between the node 214 and a capabilities node 348. The capabilities node 348 and the nodes 352 and 350 are linked by edges 396 and 394.

The device hub 332 is linked to a cluster 336 via an edge 384. The cluster 336 is linked to connector A 340 and connector B 338 by edges 386 and the edge 389. The connector A 340 and the connector B 338 is linked to an external system 344 via edges 388 and 390. The external system 344 is linked to a door actuator 342 via an edge 392.

Figure 4:
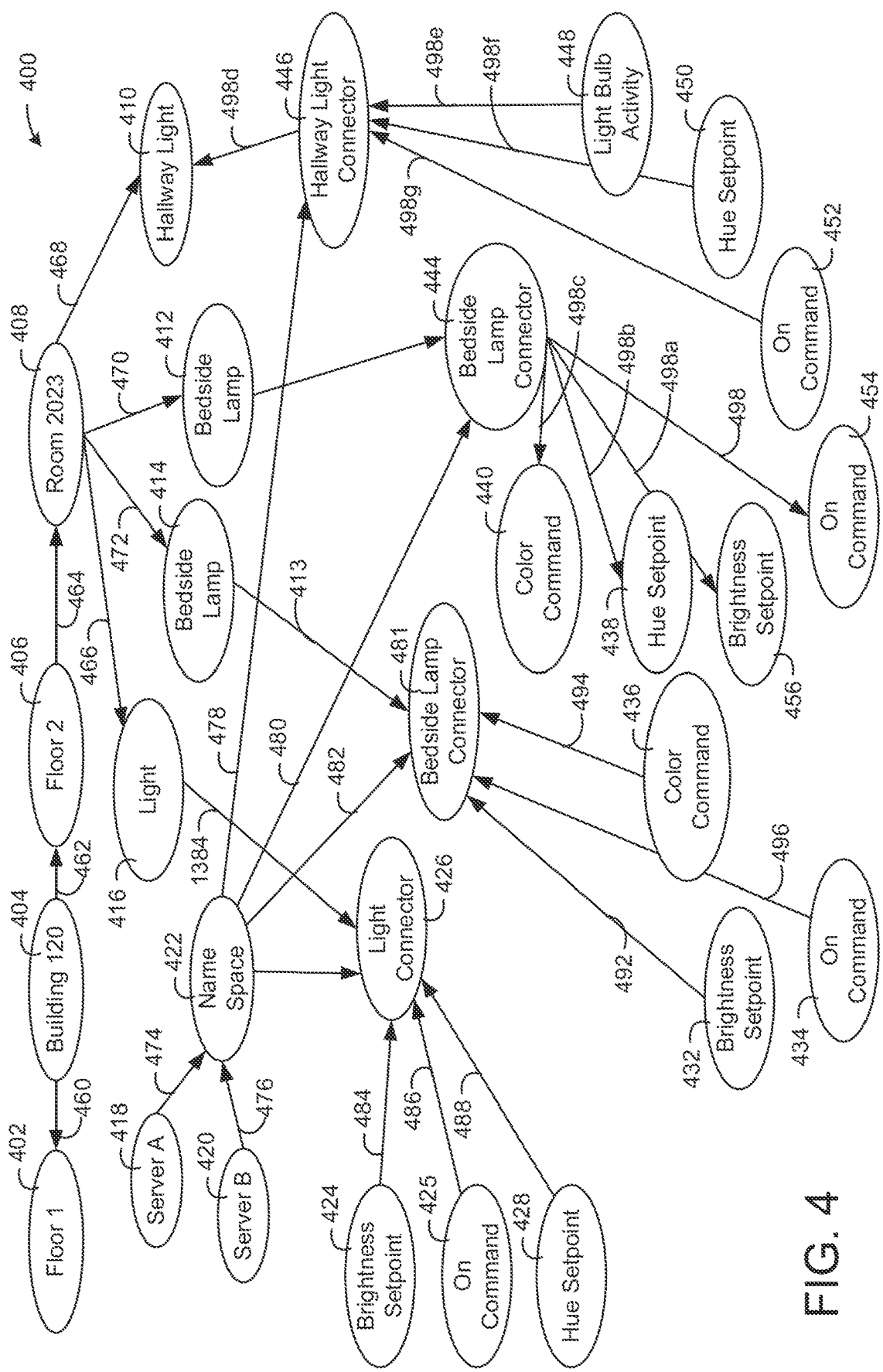
FIG. 4 is a graph projection of the twin manager of FIG. 1 including equipment and capability data for the equipment, according to an exemplary embodiment.

Referring now to FIG. 4, a graph projection 400 of the twin manager 108 including equipment and capability data for the equipment is shown, according to an exemplary embodiment. The graph projection 400 includes nodes 402-456 and edges 360-498f. The cloud platform 106 can search the graph projection 400 to identify capabilities of different pieces of equipment.

A building node 404 represents a particular building that includes two floors. A floor 1 node 402 is linked to the building node 404 via edge 460 while a floor 2 node 406 is linked to the building node 404 via edge 462. The floor 2 includes a particular room 2023 represented by edge 464 between floor 2 node 406 and room 2023 node 408. Various pieces of equipment are included within the room 2023. A light represented by light node 416, a bedside lamp node 414, a bedside lamp node 412, and a hallway light node 410 are related to room 2023 node 408 via edge 466, edge 472, edge 470, and edge 468.

The light represented by light node 416 is related to a light connector 426 via edge 484. The light connector 426 is related to multiple commands for the light represented by the light node 416 via edges 484, 486, and 488. The commands may be a brightness setpoint 424, an on command 425, and a hue setpoint 428. The cloud platform 106 can receive a request to identify commands for the light represented by the light 416 and can identify the nodes 424-428 and provide an indication of the commands represented by the node 424-428 to the requesting entity. The requesting entity can then send commands for the commands represented by the nodes 424-428.

The bedside lamp node 414 is linked to a bedside lamp connector 481 via an edge 413. The connector 481 is related to commands for the bedside lamp represented by the bedside lamp node 414 via edges 492, 496, and 494. The command nodes are a brightness setpoint node 432, an on command node 434, and a color command 436. The hallway light 410 is related to a hallway light connector 446 via an edge 498d. The hallway light connector 446 is linked to multiple commands for the hallway light node 410 via edges 498g, 498f, and 498e. The commands are represented by an on command node 452, a hue setpoint node 450, and a light bulb activity node 448.

The graph projection 400 includes a name space node 422 related to a server A node 418 and a server B node 420 via edges 474 and 476. The name space node 422 is related to the bedside lamp connector 481, the bedside lamp connector 444, and the hallway light connector 446 via edges 482, 480, and 478. The bedside lamp connector 444 is related to commands, e.g., the color command node 440, the hue setpoint command 438, a brightness setpoint command 456, and an on command 454 via edges 498c, 498b, 498a, and 498.

Figure 5A:
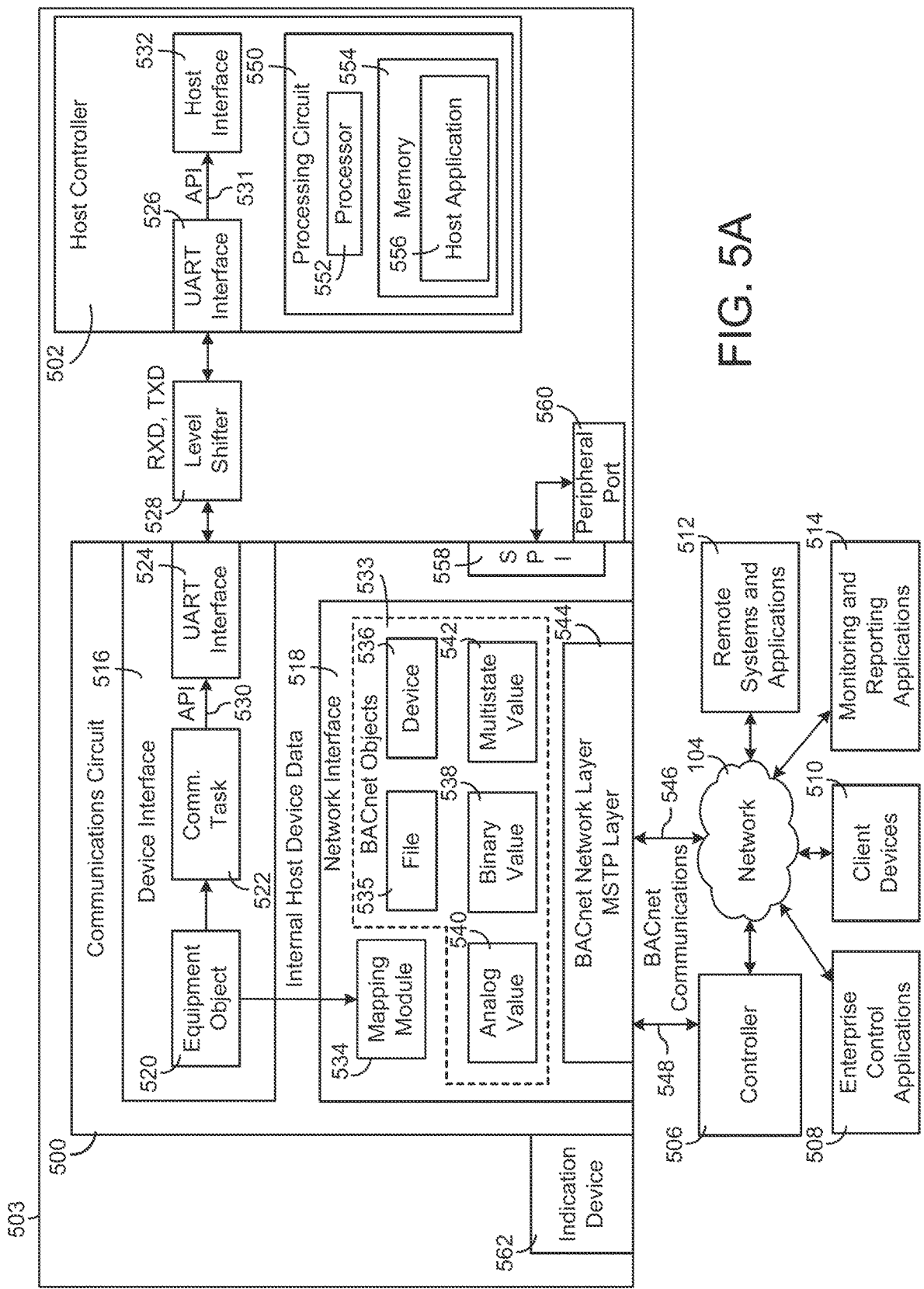
FIG. 5A is a block diagram illustrating a communication circuit in communication with a host device, according to some embodiments.

Referring now to FIG. 5A, a block diagram illustrating a communications circuit 500 in communication with a host controller 502 is shown, according to some embodiments. In some embodiments, the host controller 502 and the communications circuit 500 are contained within a BMS device 503. The BMS device 503 can be any number of devices, including any of the BMS devices listed above. The device 503 can be a building device. The building device 503 can be an HVAC device, such as a chiller, an actuator, a valve, thermostat, field controller, sensor, an AHU, an RTU, a boiler, etc. The building device 503 can be a fire suppression device, a security device, a piece of laboratory equipment, etc. The host controller 502 may be a proprietary device specific to the BMS device 503, and used to control the BMS device 503. As shown in FIG. 5A, both the communications circuit 500 and the host controller 502 can be located within the BMS device 503. In some embodiments, the communications circuit 500 is a system on a chip, an integrated circuit, chip, or microcontroller unit (MCU) separate from a processing circuit of the host controller 502, and configured to bridge communications between the host controller 502 and other external systems or devices. In some embodiments, the communications circuit 500 is a separate circuit board (daughter board) containing the required circuitry, located within the BMS device 503, and in communication with the host controller 502. In some embodiments, the communications circuit 500 is a separate device coupled to the BMS device 503, and in communication with the host controller 502. This may allow for a communications circuit 500 to be installed on a BMS device 503 to allow for a BMS device 503 without network connectivity to be easily converted to communicate via a BMS network, such as BACnet.

The communications circuit 500 can be configured to support a variety of data communications between the host controller 502 and other external systems or devices via a network 104. As illustrated in FIG. 5A, other systems or devices can include controllers 506, enterprise control applications 508, client devices 510, remote systems and applications 512 and/or monitoring and reporting applications 514. The communications circuit 500 can be a wired or wireless communication link and may use any of a variety of disparate communications protocols (e.g., BACnet, LON, WiFi, Bluetooth, TCP/IP, etc.) to communicate with the network 104 and/or directly to other external systems or devices. For example, the communications circuit 500 can be a pre-certified BACnet communication circuit capable of communicating on a building automation and controls network (BACnet) using a master/slave token passing (MSTP) protocol. The communications circuit 500 can be added to any existing host device with a communication interface to enable BACnet communication with minimal software and hardware design effort. In some embodiments, communications circuit 500 provides a BACnet interface for the host controller 502.

The communications circuit 500 is shown to include a device interface 516 and a network interface 518. In some embodiments, the network interface 518 is a BACnet interface. The device interface 516 can include an equipment object 520, a communications task (e.g., a JBOC task) 522, and a universal asynchronous receiver/transmitter (UART) interface 524. The UART interface 524 can be configured to communicate with a corresponding host UART interface 526 of the host controller 502 using a UART protocol. In other examples, the UART interfaces 524, 526 can be replaced with serial peripheral interfaces (SPI) or inter-integrated circuit (I2C) interfaces. In some embodiments, a level shifter 528 device may be required to ensure that the signal levels from the host controller 502 are compatible with the UART 524 of the device interface 516, and vice versa. In some embodiments, the level shifter 528 can be a TCA9406DCTR from Texas Instruments; however, other level shifting devices are contemplated.

The communication task module 522 can be connected to the UART interface 524 via an application-program interface (API) 530 and can be configured to populate the equipment object 520 with values received from the processing circuit 550 via the UART interfaces 524, 526. The communications task module 522 can also read values of the equipment object 520 populated by the network interface 518 and can provide the values to the host controller 502. Similarly, the host UART interface 526 can be connected to a host interface 532 via an API 531 and can be configured to communicate with a host application. In some embodiments, the host controller 502 sets the baud rate to be used for communication between the host controller 502 and the communications circuit 500 using the UART interfaces 524, 526. In a further embodiment, the UART interfaces 524, 526 are configured to operate in a half-duplex mode. When the UART interfaces 524, 526 are configured in a half-duplex mode, one device will be responsible for initiating all commands. In one embodiment, the host controller 502 is configured to communicate using a half-duplex mode wherein the host controller 502 can transmit all commands, and the communications circuit 500 can only transmit a command in response to a command transmitted by the host controller 502. This configuration provides the host controller 502 with total control of the flow of data between the host controller 502 and the communications circuit 500. In other examples, the UART interfaces 524, 526 can be configured to operate in full-duplex mode.

The equipment object 520 can be a proprietary equipment object configured to expose host controller 502 data to the network interface 518 as a single object with one or more associated attributes. In some embodiments, the equipment object 520 maps the data received from the host controller 502 into an associated attribute within the equipment object 520. Attributes of the equipment object 520 can be defined by a user (e.g., using a data definition tool) to expose any type of internal host controller 502 data to the network interface 518. In some embodiments, the host controller 502 instructs the communication circuit 500 which attributes within the equipment object are to be exposed to the network interface 518. For example, the host controller 502 may provide a master list of attributes to the equipment object 520 during an initial setup. The host controller 502 may then instruct the communication circuit 500 to only expose a subset of attributes of the equipment object 520 from the master list of attributes to the network interface 518. In some embodiments, a user may select which attributes are to be exposed to the network interface 518 during the initial configuration of the BMS device 503. For example, the user may indicate which attributes are to be exposed to the network interface 18 using a configuration tool, as described in more detail below. In some embodiments, the host controller 502 may automatically determine which attributes are to be exposed to the network interface 518 based on the data type. For example, the host controller 502 may instruct the communication circuit 500 not to expose "static" data of the BMS device 503, as described in more detail below.

The network interface 518 may read the attributes of the equipment object 520 and map the attributes of the equipment object 520 to network objects, such as BACnet objects 533 via a mapping module 534. In some embodiments, the network interface 518 may only map those attributes that are selected to be exposed to the network objects 533 by the host controller 502. Example BACnet objects may include: a file data object 535, including read and/or write file services; a device data object 536 (i.e. BACnet device object data); a binary value data object 538 (e.g. relay output states, switch positions, on/off device status); an analog value data object 540 (e.g. speed, temperature, flow, pressure, etc.), which can include analog value objects with or without priority; and a multistate value data object 542, which can include multistate value objects with or without priority. Additionally, other BACnet objects 533 may include a structured view, a char string and an integer. In one embodiment, the network interface 518 can be configured to write the values of the BACnet objects 533 to attributes of the equipment object 520. The attribute values of the equipment object 520 can be communicated to the host controller 502 via the UART interfaces 524, 526 and be used to operate the host controller 502.

The host controller 502 can be configured to interface with the attributes of the equipment object 520 in a more concise fashion than the standard BACnet point objects. For example, the host controller 502 can read and write various items of internal host controller data to the equipment object 520 as attribute values of the equipment object 520. The equipment object 520 can then expose the values of the attributes to the network interface 518, as described above. The mapping module 534 may then map the values of the exposed attributes to one or more of the BACnet objects 533. In one embodiment, the mapping module 534 evaluates parameters of the attributes of the equipment object 520, such as data type, attribute ID, whether the attribute is modifiable, etc. The mapping module 534 may then map the exposed attribute values of the equipment object 520 to the appropriate BACnet object 533 based on the evaluated parameters. In one embodiment, the mapping module 534 may continuously evaluate the attribute values in the equipment object 520, and thereby continuously map the attribute values to the BACnet objects 533. Alternatively, the equipment object 520 may provide an interrupt signal to the mapping module when an attribute value has been modified. The mapping module 534, receiving the interrupt, may then proceed to evaluate the attribute values in the equipment object 520, and map the attribute values to the BACnet objects 533. In further examples, the mapping module 534 may evaluate the exposed attribute values at predetermined intervals. For example, the mapping module 534 may evaluate the exposed attribute values in one second intervals. However, predetermined intervals of more than one second or less than one second are also contemplated. In some embodiments, the mapping module 534 may further be able to instruct the network interface 518 to generate one or more BACnet objects 533 for one or more exposed attributes within the equipment object 520. For example, once the equipment object 520 has been configured by a user, as described above, the mapping module 534 may read the exposed attributes via the network interface 518. For example, the mapping module 534 may read parameters associated with the exposed attributes such as attribute ID's, data types, whether the data is modifiable, object names, etc. The mapping module 534 may then instruct the network interface 518 to generate one or more BACnet attributes of the required type (e.g. analog, binary, multistate, etc.) to receive the values associated with the exposed equipment object 520 attributes.

Once the attributes of the equipment object 520 have been exposed to the network interface 518, a BACnet/MSTP layer 544 may read the BACnet objects 533. The BACnet/MSTP layer 544 can be configured to facilitate BACnet communications using the MSTP master protocol. For example, the BACnet/MSTP layer 544 can be configured to transmit and receive segmented messages. In some embodiments, the BACnet/MSTP layer 544 may only transmit segmented messages to devices that subscribe to the BMS device 503 via a BACnet Subscription Service. In some embodiments, the BACnet/MSTP layer 544 may make the data values contained in the BACnet objects 533 available to other devices or systems via the network 104. The BACnet/MSTP layer 544 can further be configured to automatically determine a baud rate. In some embodiments, the baud rate can be manually specified in the BACnet/MSTP layer 544. In some embodiments, the BACnet/MSTP layer 544 is capable of operating at the following baud rates: 9600, 19200, 38400, and 76800. The BACnet/MSTP layer 544 may further support duplicate address avoidance by keeping a second device with a duplicate address from interfering with existing traffic. In some embodiments, the BACnet/MSTP layer 544 supports the maximum MSTP Application Protocol Data Unit (APDU) size of 480 bytes. The BACnet/MSTP layer 544 may allow for the transmission/reception of change of value (COV) command flags. In some embodiments, the BACnet/MSTP layer 544 can accept and/or generate data packets bundling multiple COV's into a single message. While FIG. 5 illustrates a BACnet/MSTP layer, it is contemplated that other communication layers may be used in the network interface 518.

In some embodiments, the BACnet/MSTP layer 544 reads the BACnet objects 533, and transmits the values associated with the BACnet objects 533 to the network 104, via a communication link 546 using BACnet communication protocols. The communication link 546 may be a wireless interface. In some embodiments, the communication link 546 is a Wi-Fi (802.11x) interface. Other wireless interfaces such as Bluetooth, Near Field Communication (NFC), LoRa RF, Cellular (3G, 4G, LTE, CDMA, etc.), Zigbee, etc. may also be used as the network interface 518. In some embodiments, the network interface 518 may be a wired interface, such as an Ethernet connections (CAT5, CAT6, etc.), a serial connection (RS-232, RS-485), or other applicable wired communication interfaces.

In some embodiments, the network 104 is a cloud-based (i.e. hosted) server. The cloud-based server may allow for devices to access the network via an internet connection. For example, one or more of the controller 506, the enterprise control applications 508, the client devices 510, the remote systems and applications 512, and the monitoring and reporting applications may access the network 104 via an internet connection. In some embodiments, the network 104 can be an internal BMS network, such as a BACnet network, wherein the network 104 can provide communication between BMS devices in the BMS system. The network 104 can be a closed network in some instances, thereby only allowing access to the network 104 from within the BMS system. Alternatively, the network 104 may be an open network, thereby allowing access from a user outside of the BMS network.

In some embodiments, the communications circuit 500 communicates directly with the controller 506 via a controller communication interface 548 using the BACnet MSTP layer 544. The controller communication interface 548 may be an isolated RS-485 serial connection. In some embodiments, the controller communication interface 548 may be a serial connection such as RS-232, a wireless connection such as Wi-Fi (802.11x), Bluetooth, NFC, Zigbee, LoRa RF, cellular (3G, 4G, LTE, CDMA, etc.), or other communication system, as applicable. Further, the controller communication interface 548 may be a wired connection such as an Ethernet connection (CAT5, CAT6), a local area network (LAN), or other wired connection, as applicable. In some embodiments, the controller 506 is a BMS controller as described above in regards to FIGS. 1-4, described above. In some embodiments, the controller 506 receives data from the host controller 502 via the communications circuit 500 as described above, and then communicates the data to the network 104. Alternatively, the controller 506 may directly communicate the data to other devices, such as the enterprise control applications 508, the client devices 510, the remote systems and applications 512 and/or the monitoring and reporting applications 514. In some embodiments, both the controller 506 and the network 104 may receive data from the communications circuit 500. In some embodiments, the controller 506 can monitor a specific value, such as an analog value exposed to the analog value object 540. Further, the BMS controller may monitor any of the BACnet objects as required or desired by the user.

The host controller 502 may include a processing circuit 550. The processing circuit may include a processor 552 and a memory 554. The processor 552 may be a general purpose or specific purpose processor, an application specific integrated circuit (ASIC), one or more field programmable gate arrays (FPGAs), a group of processing components, or other suitable processing components. The processor 552 can be configured to execute computer code or instructions stored in the memory 554 or received from other computer readable media (e.g., CDROM, network storage, a remote server, etc.).

The memory 554 may include one or more devices (e.g., memory units, memory devices, storage devices, etc.) for storing data and/or computer code for completing and/or facilitating the various processes described in the present disclosure. The memory 554 may include random access memory (RAM), read-only memory (ROM), hard drive storage, temporary storage, non-volatile memory, flash memory, optical memory, or any other suitable memory for storing software objects and/or computer instructions. The memory 554 may include database components, object code components, script components, or any other type of information structure for supporting the various activities and information structures described in the present disclosure. The memory 554 may be communicably connected to the processor 552 via the processing circuit 550 and may include computer code for executing (e.g., by the processor) one or more processes described herein. When the processor 552 executes instructions stored in the memory 554, the processor 552 generally configures the host controller 502 (and more particularly the processing circuit 550) to complete such activities.

In some embodiments, the memory stores a host application 556. The host application 556 can include the required application for operating the host device. In one embodiment, the host application 556 can generate updated values for the attributes of the equipment object 520, which can be communicated to the device interface 516 via the UART interfaces 524, 526, as described above. The host application 556 can include software to read and store data received by the host controller 502. For example, the host controller 502 may include sensors for detecting various attributes of the host controller 502. Example sensors can include voltage sensors, current sensors, temperature sensors, position sensors, pressure sensors, or other applicable sensors. The host application may read and/or store the data from these sensors within the memory 554. Further, the host controller 502 may include other data such as setpoints, position commands, diagnostic data, etc., which the host application 556 can further read and store in the memory 554.

The host application 556 can further receive data and/or commands for controlling the host controller 502. In one embodiment, the host interface 532 may receive data via the UART interface 526, and communicate the data to the host application 556. For example, the controller 506 may communicate with the communications circuit 500 and change a setpoint within the analog value BACnet object 540. The network interface 518 can then modify the corresponding attribute in the equipment object 520, which can then be communicated to the host device via the UART interfaces 524, 526. The host interface 532 can then receive the data via the host API 531. The host interface 532 may be configured to convert the received data (e.g. the setpoint change) into a format compatible with the host application 556. The host application 556, receiving the data (setpoint change) can then implement the setpoint change on the host controller 502. In some embodiments, the host application 556 may receive inputs or commands directly from a user interface (not shown) of the host controller 502. The host application can then update any changes provided via the user interface in the equipment object 520 by communicating the changes to the host interface 532. The host interface 532 may then communicate the changes to the equipment object 520 via the UART interfaces 524, 526.

The communications circuit 500 may further include a serial peripheral interface (SPI) bus driver 558. The SPI bus driver 558 can be used to drive a peripheral port 560 on the communication circuit. In one embodiment, the peripheral port 560 is a serial flash interface, such as a USB port, an SD or micro SD port, a compact flash (CF) port, etc. The peripheral port 560 may further be a serial interface (RS-232, RS-485) for direct wired connection to a hardware device, such as a commissioning tool or a programming tool. The peripheral port 560 can be used to allow for communication directly with the communications circuit 500. In some examples, the peripheral port 560 can be used to provide a software (SW) and/or a firmware (FW) update directly to the communications circuit 500. Further, the peripheral port 560 may be configured as a programming port, thereby allowing a user to directly program the communication circuit. For example, a user may access the communications circuit 500 via the peripheral port 560 to program the attributes of the equipment object 520 that are to be exposed to the network interface 518. In some examples, the peripheral port 560 can be used to provide additional memory, such as flash memory (SD, CF, etc.). The additional memory may be used to store data associated with the host controller 502, such as historical data, alarm history, data logs, etc.

The communications circuit 500 may further include an indication device 562. In one embodiment, the indication device 562 can include one or more illumination devices, such as LEDs. However, the indication device 562 can further include other illumination devices, auditory indication devices (speakers, buzzers), or a combination thereof. In one embodiment, the indication device 562 provides a visual indication that the communication circuit is communicating with the network 104 and/or the controller 506. Alternatively, the indication device 562 can provide an indication that the communications circuit 500 is communicating with the host controller 502. In a further embodiment, the indication device 562 can provide an indication of a status of the communications circuit 500. For example, the indication device 562 may present one color (e.g. green) when the communications circuit 500 is functioning properly, and a second color (e.g. red) when the communications circuit 500 is not functioning properly. Further, the indication device 562 may provide an indication of a status of the host controller 502 instead of, or in addition to the communications circuit 500. In still further examples, the indication device 562 may provide a series of visual and/or audible outputs in a repeating pattern that may represent a certain fault currently experienced by the communications circuit 500 and/or the host controller 502.

Figure 5B:
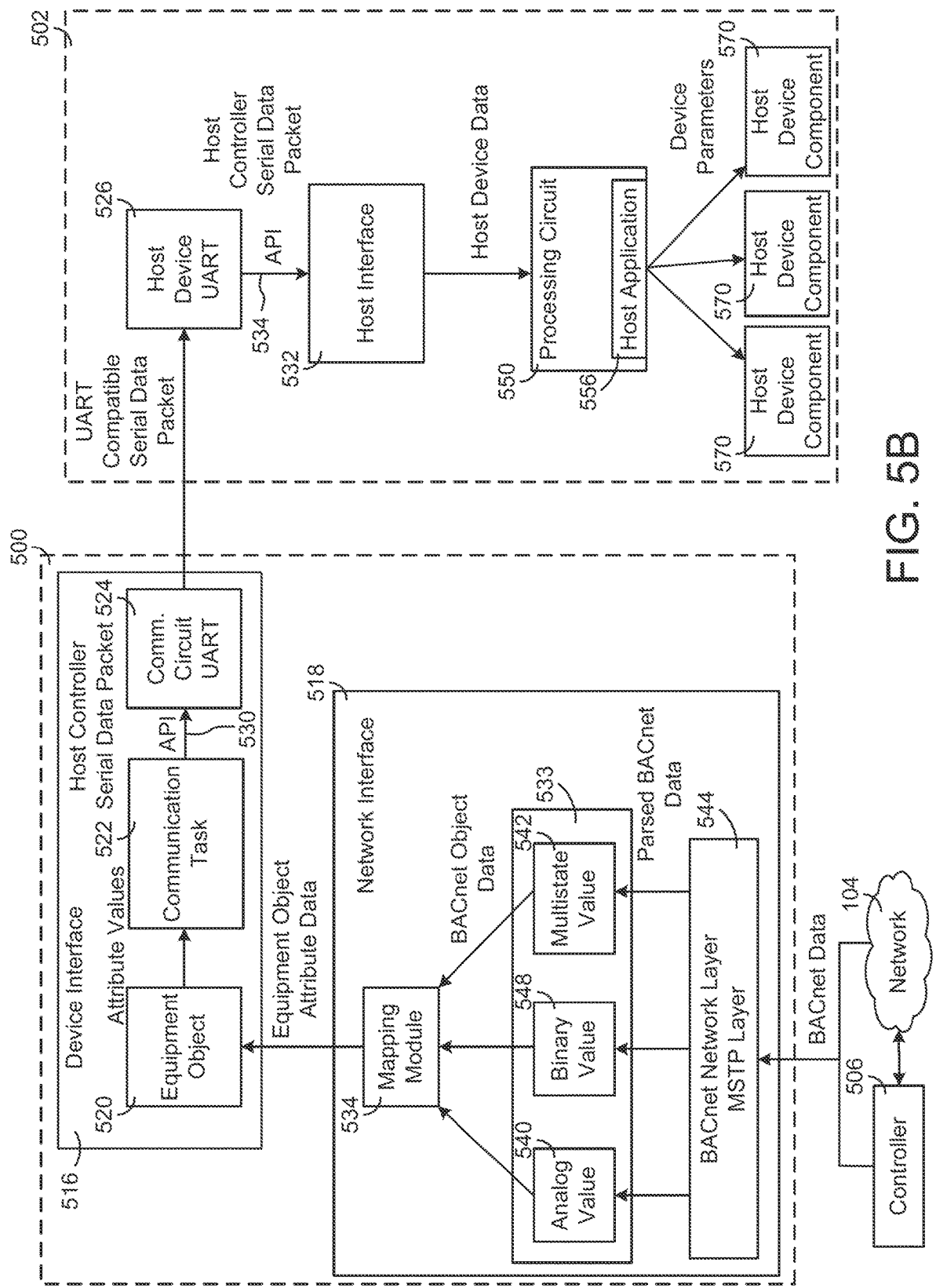
FIG. 5B is a block diagram illustrating the flow of data from an external network to the communication circuit of FIG. 5A, according to some embodiments.

Turning now to FIG. 5B, a block diagram illustrating the flow of data from the network 104 and/or the controller 506 to the communications circuit 500 is shown, according to some embodiments. As shown in FIG. 5B, network 104 is a BACnet network; however, other networks are contemplated. The network 104 and/or the controller 506 may provide BACnet data to the communications circuit 500. The BACnet data may be received by the BACnet/MSTP layer 544. The BACnet/MSTP layer 544 may parse the received BACnet data. In one example, the BACnet/MSTP layer 544 may parse the received BACnet data to isolated data associated with one or more BACnet Objects 533. For example, the BACnet/MSTP layer 544 may first parse the data based on data type (analog, binary, multistate, etc.). The BACnet/MSTP layer 544 may then evaluate an ID associated with the BACnet data to determine what BACnet object is associated with the received BACnet data. The BACnet/MSTP layer 544 may then transmit the parsed BACnet data to one or more BACnet objects 533 via the network interface. For example, the BACnet/MSTP layer 544 may transmit parsed analog BACnet data to the analog BACnet object 540, parsed binary BACnet data to the binary BACnet object 538, and parsed multistate BACnet data to the multistate BACnet object 542. This is exemplary only, as there may be more BACnet object types available as described above. Further, multiples of each BACnet object type may further be provided. In one embodiment, the BACnet/MSTP layer 544 can instruct the network interface to generate new BACnet objects when BACnet data is received that is not associated with an existing BACnet object 533. The BACnet objects 533 may then provide the associated BACnet Object data to the mapping module 534. The mapping module 534 may then receive the BACnet Object data by querying each of the BACnet objects to determine if a value had been updated. Alternatively, the BACnet objects may provide an interrupt, or other signal, to the mapping module 534 to instruct the mapping module 534 to read a new BACnet object 533 value. The mapping module 534 may then evaluate the received BACnet object data to determine which attribute of the equipment object 520 the received BACnet object data is associated with and transmit the data to the equipment object 520 as equipment object attribute data via the network interface 518. In one embodiment, the mapping module 534 transmits equipment object attribute data for each of the one or more BACnet objects 533 to the equipment object 520 where the equipment object attributes associated with the one or more BACnet objects are exposed to the network interface 518. Similarly, the mapping module 534 may only transmit equipment object attribute data to the equipment object 520 where the associated equipment object attribute is a writeable attribute. As will be described later, a user, via a configuration tool, can configure equipment object attributes that are exposed and/or writable.

The equipment object 520 may then transmit attribute values to the communication task module 522. The attribute values may contain the attribute ID, as well as the data type and value. Alternatively, the attribute values may only contain the value associated with the attribute. In some embodiments, the communication task module 522 reads the attribute values for the equipment object attributes, and determines if any values have been changed. The communication task module 522, receiving the equipment object attribute values, may then convert the attribute values into one or more host controller serial data packets. The host controller serial data packets may be configured such that the data packets are readable by the host device. The host controller data packets may then be read by the UART 524 and converted into a UART compatible serial data packet. In some embodiments, the API 530, as described above, may be used to convert the host control serial data packets into UART compatible serial data packets. In some embodiments, the UART 524 may convert the attribute values into UART compatible serial data packets itself. The UART 524 may then transmit the UART compatible serial data packet containing the attribute values to the host controller 502. The UART 526 can receive the UART compatible serial data packet and convert the data into host controller serial data packets, readable by the host controller. In some embodiments, the UART 526 can perform the conversion. In other embodiments, the API 531 can convert the UART compatible serial data packet into a host controller serial data packet. The host controller serial data packet may then be received by the host interface 532. The host interface 532 may then convert the host controller serial data packet into host device data to be processed by the processing circuit 550. The host device data may be a proprietary data format used by the processing circuit 550 of the host controller 502. In some embodiments, host device data may be a standard data type used by the particular processing circuit 550.

The processing circuit 550 can then read the host device data via the host application 556. The host application 556 allows the data to be parsed and executed. In some embodiments, the host application may output device parameters to one or more host device components 570. The host device components may be any components in communication with the processing circuit 550. For example, the host device components 570 may include switches, motor controllers, sensors, relays, indicators, or any other components within the BMS device 503 which is used by the BMS device 503 to operate. For example, a host device component 570 may be a motor starter relay. The host application 556, via the processing circuit 550 may output a logic 1 to the motor starter relay to close, thereby turning on a motor. In a more complex example, the host device component 570 may be a variable frequency motor controller. In this example, the host application 556 via the processing circuit 550 may output a motor speed command. Thus, a command or request may be generated by the network 104 and/or the controller 506 and executed at a component level of the BMS device 503 using the above embodiment.

Figure 5C:
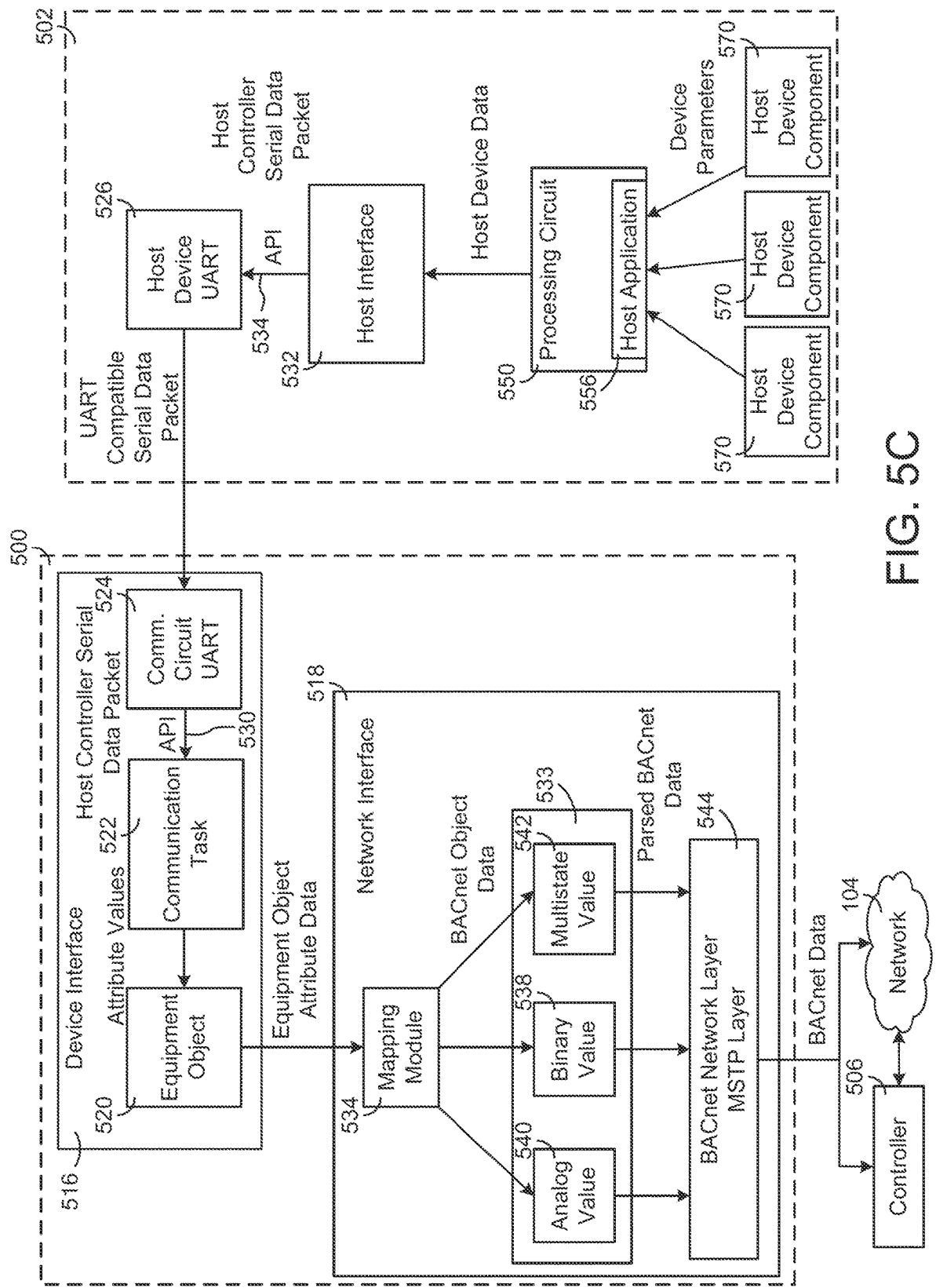
FIG. 5C is a block diagram illustrating the flow of data from the communication circuit of FIG. 5A to an external network, according to some embodiments.

Turning now to FIG. 5C a block diagram illustrating the flow of data from the host controller 502 to the network 104 and/or the controller 506 is shown, according to some embodiments. Within the BMS device 503, one or more of the host device components 570 may provide device parameters associated with one or more parameters of the host device component 570 to the processing circuit 550. Device parameters can include parameters related to motor speed, temperature, positions, or any other device parameters associated with the host device components 570 within the BMS device 503. The device parameters can be processed by the host application 556 within the processing circuit 550. In some embodiments the processing circuit 550 may determine that the received device parameters may need to be provided to the network 104 and/or the controller 506. For example, the processing circuit 550 may be configured to provide all updated parameters to the network 104 and/or the controller 506. In other examples, the processing circuit 550 may be configured to provide device parameters to the network 104 and/or the controller 506 when the device parameters exceed a certain value. In still further examples, the processing circuit 550 may provide the device parameters to the network 104 and/or the controller 506 at predetermined intervals or at predetermined times of the day. For example, the processing circuit 550 may be configured to provide the device parameters to the network 104 and/or the controller 506 at 6 A.M., Noon, 6 P.M. and Midnight. However, the predetermined intervals or times may be any predetermined intervals or times provided by a user. Additionally, the processing circuit 550 may be configured to provide the device parameters to the network 104 and/or controller 506 upon receiving an instruction to do so from the network 104 and/or the controller 506. This may be in conjunction with any of the other configurations described above. Further, the processing circuit 550 may also provide additional data associated with the processing circuit 550 itself, such as alarms, data logs, etc.

The processing circuit 550 may provide host device data containing data relating to the BMS device 503 (e.g. the processing circuit 550 and/or the host device components 570) to the host interface 532. The host interface 532 may be configured to receive the host device data and convert the host device data received from the processing circuit into one or more host controller serial data packets for transmission to the communications circuit 500. The host controller serial data packet may then be provided to the UART 526, which may convert the host controller serial data packet into a UART compatible serial data packet. In one embodiment, UART 526 may convert the host controller serial data packet into the UART compatible serial data packet. Alternatively, the API 531 may be used to convert the host controller serial data packet into the UART compatible serial data packet. The UART serial data packet may then be transmitted to the UART 524 of the communications circuit 500. The UART 524 may then convert the UART serial data packet back into the host controller serial data packet. In one embodiment the UART 524 converts the UART serial data packet into the host controller serial data packet. In other embodiments, the API 530 converts the UART serial data packet into the host controller serial data packet.

The host controller serial data packet may then be received by the communication task module 522. The communication task module can read the host controller serial data packet and parse the host controller serial data packet to extract one or more attribute values. In one embodiment, the attribute values are values associated with the BMS device 503, such as the device parameters of the host device components 570, or values associated with the processing circuit. The communication task module 522 may then output the attribute values to the respective attributes within the equipment object 520. In one embodiment, the communication task module 522 may determine which parsed values are associated with a given attribute of the equipment object by reading an identifier associated with each portion of the received data, and map that to a corresponding attribute within the attribute value. In one example, a user can configure the equipment object attributes to relate to data received from the host device by assigning certain data identifiers contained within the host controller serial data packet to a given equipment object attribute. As will be discussed in more detail below, the equipment object 520 can be configured using a configuration device.

The attribute values stored within the attributes of the equipment object 520 can be read by the mapping module 534. The mapping module 534 may determine if an attribute value has changed by constantly monitoring the equipment object 520. In other embodiments, the equipment object 520 may provide an interrupt signal to the mapping module 534, indicating that an attribute value has been updated. The mapping module 534 may then read the equipment object attribute data from the equipment object 520 and convert the equipment object attribute data in to BACnet object data. The mapping module 534 may further be configured to then transmit the updated BACnet Object Data to the appropriate BACnet object 533. In some instances, a BACnet object may not current exist that is associated with a particular equipment object attribute. The mapping module 534 may then generate a new BACnet object via the network interface 518. In one embodiment, the mapping module 534 may already be configured to associate a given BACnet object 533 with an equipment object 520 attribute. In one embodiment, the mapping module 534 may read an attribute ID for each received equipment object attribute data to determine which BACnet object to map the received data to. In some embodiments, the equipment object 520 may be configured to not expose certain attributes to the mapping module 534. In those instances, the received attribute values are stored in the equipment object 520, but are not provided to the mapping module 534.

Once the BACnet objects 533 receive the BACnet object data, the BACnet/MSTP layer 544 can read the BACnet objects 533 to determine if any values have been modified. In one embodiment, the BACnet/MSTP layer 544 may constantly read all of the BACnet objects 533 to determine if any values have been changed. In other embodiment, one or more of the BACnet objects 533 may provide an interrupt signal to the BACnet/MSTP layer 544 to indicate a value has changed. The BACnet/MSTP layer 544 may then read one or more of the BACnet objects 533 to receive parsed BACnet object data from the BACnet objects 533. For example, if binary BACnet object 538 contained updated information, the BACnet/MSTP layer 544 may request and receive data only from the Binary BACnet object 538. The BACnet/MSTP layer 544 receiving the parsed BACnet object data may then convert the parsed BACnet object data into standard BACnet data, and transmit the BACnet data containing the data from the BMS device 503 to the network 104. As described above, the BACnet/MSTP layer 544 may, in some examples, only transmit the BACnet data to the network 104 when one or more external devices are subscribed to receive data from the host device via a BACnet subscription service. In other embodiments, the BACnet/MSTP layer 544 may make the BACnet data available to be read by one or more external devices or systems via the network 104.

It is worth nothing that network interface controllers and the components therein may be or include a variety of components and/or functionalities that are described in U.S. Patent Publication No. 2017/0295058, filed Jul. 11, 2017 and published Oct. 12, 2017, the entire disclosure of which is incorporated by reference herein in its entirety.

Figure 6:
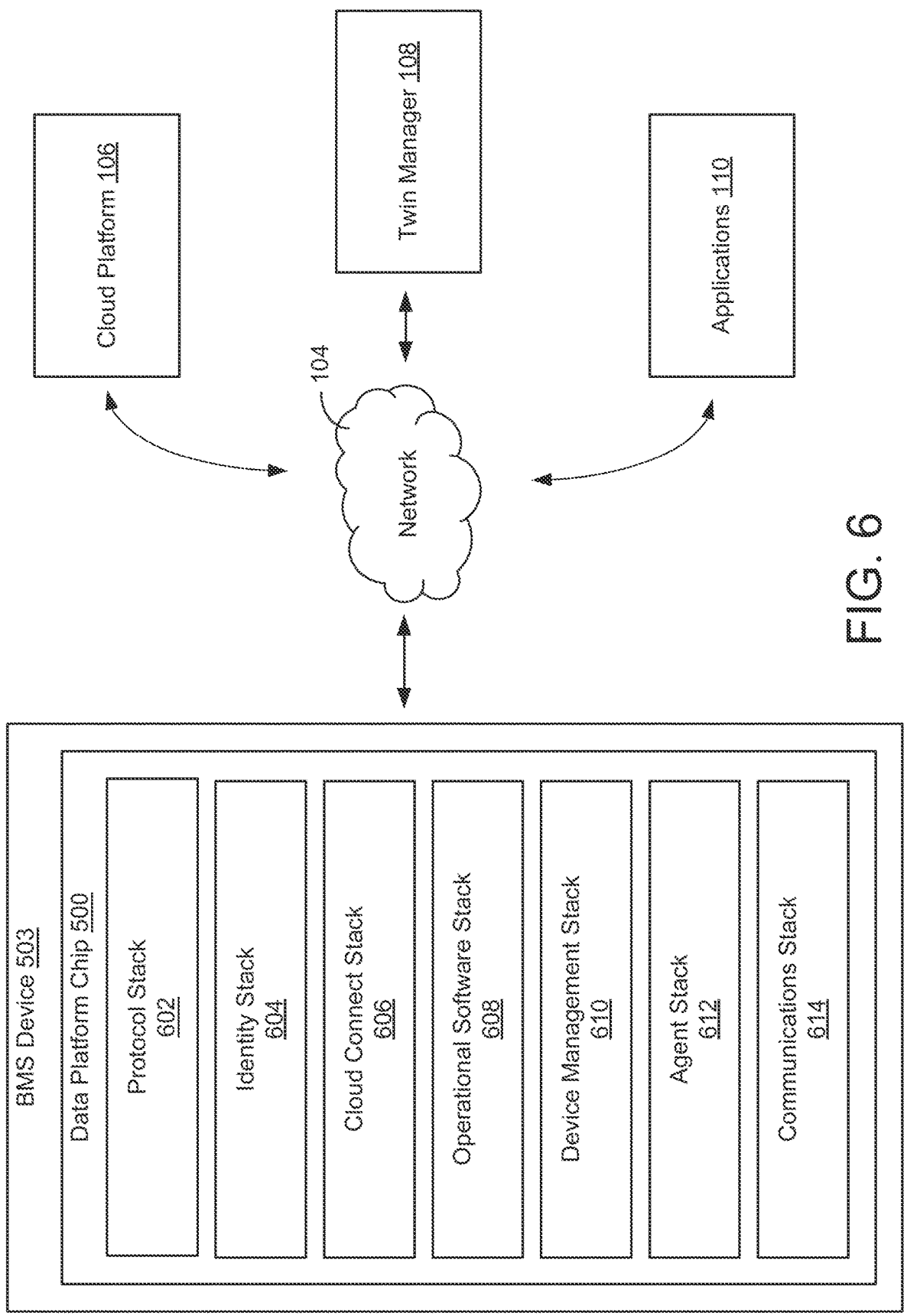
FIG. 6 is a block diagram of a building management system (BMS) device including a data platform chip to communicatively couple with the edge platform of FIG. 1, according to some embodiments.

Referring now to FIG. 6, a block diagram of a system with communication capabilities between multiple data platform components (e.g., cloud platform 106, twin manager 108, applications 110, etc.) and a building platform chip 500 is shown, according to exemplary embodiments. In some embodiments, the building platform chip 500 is integrated within a building or BMS device (e.g., BMS device 503) and is configured to perform one or more of the processes performed by at least one of the edge platform 102, the cloud platform 106, the twin manager 108, and/or the applications 110. The data platform chip 500 is shown to include protocol stack 602, identity stack 604, cloud connect stack 606, operational software stack 608, device management stack 610, agent stack 612, and communications stack 614. Once the building platform chip 500 is integrated with the BMS device 503, the building platform chip 500 can be activated. Activating the building platform chip 500 can include powering the building platform chip 500. Activating the building platform chip 500 can include transmitting data, data values, or commands from another processing circuit or circuits of the BMS device 503. The data can cause the building platform chip 500 to turn on, begin running one or more processes, establish a communication channel, begin communicating with the processing circuit or circuits of the BMS device 503, etc.

Protocol stack 602 can include memory and/or processing for allowing building platform chip 500 to communicate with a building network and/or data platform (e.g., system 100). For example, as described about, building platform chip 500 may include communications that include a pre-certified BACnet communication circuit capable of communicating on a building automation and controls network (BACnet) using a master/slave token passing (MSTP) protocol. The communications circuit 500 can be added to any existing host device with a communication interface to enable BACnet communication with minimal software and hardware design effort. In some embodiments, communications circuit 500 provides a BACnet interface for the host controller 502. Of course, the protocol stack 602 is not limited to only enabling BACnet communication, and could enable communication over other protocols (e.g., MOD-BUS, etc.) as well. The protocol stack 602 can include Internet or network based communication protocols such as TCP/IP, HTTP, UDP, MQTT.

Identity stack 604 may include memory and/or processing for determining, categorizing, and/monitoring schemas that define names and relationships for entities within building. For example, building platform chip 500 may be installed within BMS device 503 and can automatically determine name and relationship information relating to BMS device 503, and transmit that information to cloud platform 106 for further processing. Various identities and relationships can be determined using one or more schemas, such as common data modeling (CDM), Brick, and others.

Cloud connect stack 606 may include memory and/or processing for connecting to any off-premise processing devices (e.g., servers, etc.) capable of receiving information associated with BMS devices (e.g., BMS 500). For example, cloud connect stack 606 may be configured to determine entity and relationship information associated with BMS 500 and provide that data to edge platform 102. In some embodiments, some or all of the processing performed by data platform chip 500 can be implemented on a chip (e.g., processing circuit, processing card, etc.) that includes a device interface and a data platform interface. Some embodiments are described in greater detail below with reference to FIG. 7.

Operational software stack 608 may be configured to generate and/or store operational software for facilitating communication between a device interface (e.g., device interface 720, described in detail below), a data platform interface (e.g., building platform chip 500, described in detail below), and processing circuitry of the BMS device 503 (e.g., host controller 502, etc.). Communications stack 614 may be configured to include multiple communication modules. For example, communications stack 614 may include hardware/software to facilitate communication between building platform chip 500.

Figure 7:
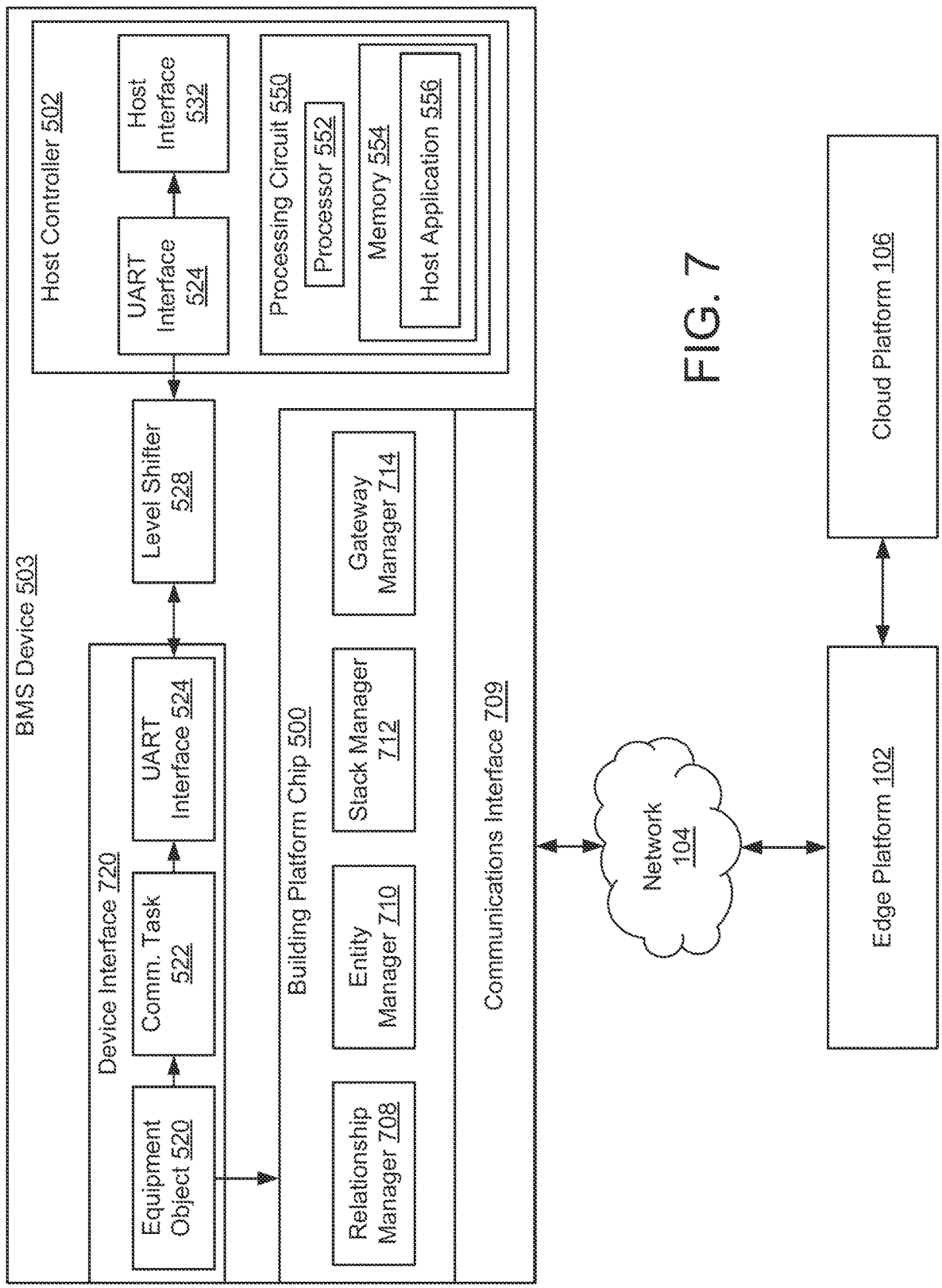
FIG. 7 is a block diagram of a BMS device with a device interface and a data platform interface, which can be used to communicate with the edge platform of FIG. 1, according to some embodiments.

Referring now to FIG. 7, a block diagram of a BMS device including circuitry for facilitating communications between BMS device 503 and building data platform 100 (e.g., edge platform 102, cloud platform 106, twin manager 108, etc.) is shown, according to some embodiments. BMS device 503 is shown to include device interface 720, building platform chip 500, and host controller 502. In some embodiments, device interface 720 and building platform chip 500 are located in a single circuit card, that is modular and is insertable/removable in BMS device 503. BMS device 503 is further shown to include communications interface 709.

Communications interface 709 can be or include wired or wireless communications interfaces (e.g., jacks, antennas, transmitters, receivers, transceivers, wire terminals, etc.) for conducting data communications. In some embodiments, communications via communications interface 709 can be direct (e.g., local wired or wireless communications) or via a communications network (e.g., a WAN, the Internet, a cellular network, etc.). For example, communications interface can include an Ethernet card and port for sending and receiving data via an Ethernet-based communications link or network. In some embodiments, communications interface 709 can include a Wi-Fi transceiver for communicating via a wireless communications network. In some embodiments, communications interface 709 can include cellular or mobile phone communications transceivers. Communications interface 709 may be configured to facilitate communications between BMS device 503 and platform 100, and/or provide graph projection or digital twin information associated with BMS device 503 to building data platform 100.

The digital twin can be or include a graph data structure, a knowledge graph, a building graph, an entity graph, a twin graph, or any type of graph based structure or portion thereof. The digital can be one of the building graphs or graph projections described with reference to FIGS. 1-4. The digital twin can include nodes representing entities, e.g., people, devices, points, events, spaces, buildings, campuses, etc. and edges representing relationships between the nodes. The digital twin can include multiple nodes that are specific virtual representations of devices, spaces, events, people, etc. For example, a graph can include one node representing a device and other nodes that represent points of the device. The graph can include edges between the node representing the device and the nodes representing the points. The graph can include edges between the node representing the device and a node representing a space of a building where the device is located. The graph can include edges between the node representing the device and other nodes representing other devices that the device controls or receives control information from. The building platform chip 500 can collect entity data or relationship data for constructing, building, or generating nodes and edges between the nodes to represent the BMS device 503. The nodes or edges can define a digital twin of the BMS device 503 and can be incorporated into a larger graph for an entire building by the building data platform 100.

Building platform chip 500 is shown to include relationship manager 708, entity manager 710, stack manager 712, and gateway manager 714. The building platform chip 500 can be system on a chip. The building platform chip 500 can include a multichip module with separate integrated circuit chips for processing, interface, and memory functions. The building platform chip 500 can be electrically coupled and integrated with a processing circuit or circuits (the device interface 720, the host controller 502, etc.) of the building platform chip 500. In some embodiments, the system on a chip can be pluggable inserted into a connector or interface on a mother board associated with the BMS device 503. The connector, interface, or receiver can be electrically coupled to a processing circuit or circuits of the BMS device 503. When the building platform chip 500 is inserted or connected to the receiver, the building platform chip 500 can be electrically coupled or connected to the processing circuits of the BMS device 503 via the receiver. In some embodiments, the building platform chip 500 is mounted, soldered, fixed, coupled to a circuit board of the BMS device 503. The circuit board can include electrical traces, electrical wires, or other electrical conductors that electrically couple the building platform chip 500 to the processing circuits of the BMS device 503 or couple the receiver to the processing circuits of the BMS device 503. The system on a chip can be specific to certain communication protocols, HVAC applications, twinning techniques, cloud control formulations, data reporting schemes, etc. Functionality for BMS device 503 can be changed by changing the system on a chip for specific functionality.

The building platform chip 500 can retrieve, receive, collect, or identify data defining a digital twin of the BMS device 503 by communicating with the host controller 502 via electrical connections between the building platform chip 500 and the circuits of the BMS device 503. For example, the host controller 502 can be a processing circuit or circuits that perform operations for the BMS device 503 and store information describing the BMS device 503 or information describing the behaviors or operations that the BMS device 503 performs. The digital twin can be or include representations of entities and relationships between the entities. The digital twin can be a building graph or graph projection that includes nodes and edges, the nodes representing the entities and the edges between the nodes representing the relationships.

The entity manager 710 can receive, retrieve, or collect data defining a digital twin of the BMS device 503 from the host controller 502. Entity manager 710 may be configured to manage the entity data associated with the BMS device 503. For example, the entity manager 710 can query or retrieve information from the host controller 502 defining an entity. The data can be or define an entity such as the BMS device 503, another BMS device connected to the BMS device 503, a data point or data object of the BMS device 503 representing a condition measured by the BMS device 503 or a control point of the BMS device 503, an event recorded or generated by the BMS device 503.

The relationship manager 708 can receive, retrieve, or collect data defining a digital twin of the BMS device 503 from the host controller 502. Relationship manager 708 may be configured to determine relationships between BMS device 503 and other devices within the building. For example, BMS device 503 may be a field controller configured to control one or more field devices (e.g., actuators, indoor units, dampers, etc.) and relationship manager 708 can obtain the relationship information between these devices from the host controller 502. This information may be obtained by querying the host controller 502, other devices on the network 104, a server, or other component including data modeling information associated with the devices within the building.

The building platform chip 500 can construct a digital twin of the BMS device 503 based on the data defining the digital twin retrieved by the relationship manager 708 and the entity manager 710. The building data platform chip 500 can generate data to cause the digital twin to be constructed. The data defining the digital twin retrieved by the relationship manager 708 and the entity manager 710 can be first data while the data generated by the building can be second data. The first data can define information used for construction of the digital twin. The second data can be a message, a command, or a value that causes the building platform chip 500, the edge platform 102, the cloud platform 106, or the twin manager 108 to construct, generator, or update a digital twin. The second data can be a message, data packet, or command including or associated with the first data. The building data platform chip 500 can construct the digital twin through communication with the building data platform 100. The digital twin can be built or constructed locally on the building platform chip 500 and then transmitted to the building data platform 100. In some embodiments, the data defining the digital twin received by the building data platform chip 500 can be transmitted to the building data platform 100 and the building data platform 100 can build the digital twin. The building platform chip 500 can generate the digital twin by generating a node for each entity identified by the entity manager 710 and generate edges between the nodes based on relationships identified by the relationship manager 708. Responsive to constructing the digital twin, the building platform chip 500 can transmit, send, or forward the digital twin to the building data platform 100.

In some embodiments, the building data platform chip 500 can transmit the data defining the digital twin to a building platform, e.g., the building data platform 100 including the edge platform 102, the cloud platform 106, or the twin manager 108. The building data platform 100 can construct the digital twin based on the data defining the digital twin received from the building platform chip 500. The building data platform 100 can store, manage, or execute the digital twin that the building data platform 100 constructs based on the data defining the digital twin received from the building data platform chip 500.

In some embodiments, the building data platform chip 500 monitors the host controller 502 through periodically (e.g., every day, every week, ever hour) retrieving data of the host controller 502. The building data platform chip 500 can monitor changes to the construction or operation of the BMS device 503. For example, the building platform chip 500 can read registers, memory locations, or other data elements of the host controller 502 and detect a change to the configuration of the BMS device 503. For example, a new sensor might be connected to the BMS device 503 or a sensor may be disconnected from the BMS device 503. The BMS device 503 may start operating or begin being operated by a new device or stop operating or begin being operated by an existing device. Furthermore, the building platform chip 500 can detect when the BMS device 503 encounters operational faults to the BMS device 503. The building platform chip 500 can communicate with the host controller 502 to detect and record events, values, event series, timeseries, etc.

Based on the detected changes or new data retrieved form the host controller 502, the building platform chip 500 can generate an updated digital twin for the BMS device 503 or the building platform chip 500 can update an existing digital twin for the BMS device 503. The building platform chip 500 can transmit the updated digital twin to the building data platform 100. In some embodiments, the building platform chip 500 can transmit or forward the data retrieved from the host controller 502 to the building data platform 100 and the building data platform 100 can generate an updated digital twin for the BMS device 503 or update an existing digital twin for the BMS device 503 stored by the building data platform 100. Updating the digital twin can include generating new nodes for a graph, deleting existing nodes for a graph, generating new edges between existing and/or new nodes, changing a node or nodes that an existing edge relates, etc.

For example, the digital twin of the BMS device 503 can include a node representing the BMS device 503 and another node representing a second device that the BMS device 503 controls. The digital twin can include a "controls" edge between node representing the BMS device 503 and the node representing the second device. If the second device is disconnected from the BMS device 503 and a new third device is connected to the BMS device 503 for the BMS device 503 to control, the update can include deleting the node representing the second device, generating a new node to represent the new third device, and modifying the "controls" edge (or generating an entirely new "controls" edge) between the node representing the BMS device 503 and the node representing the new third device.

Stack manager 712 can be configured to manage multiple software stacks located within building platform chip 500. As noted above, data platform chip 500 may include some or all of device interface 720 and/or data platform 730. Gateway manager 714 can be configured to manage communications with the one or more gateways.

Figure 8:
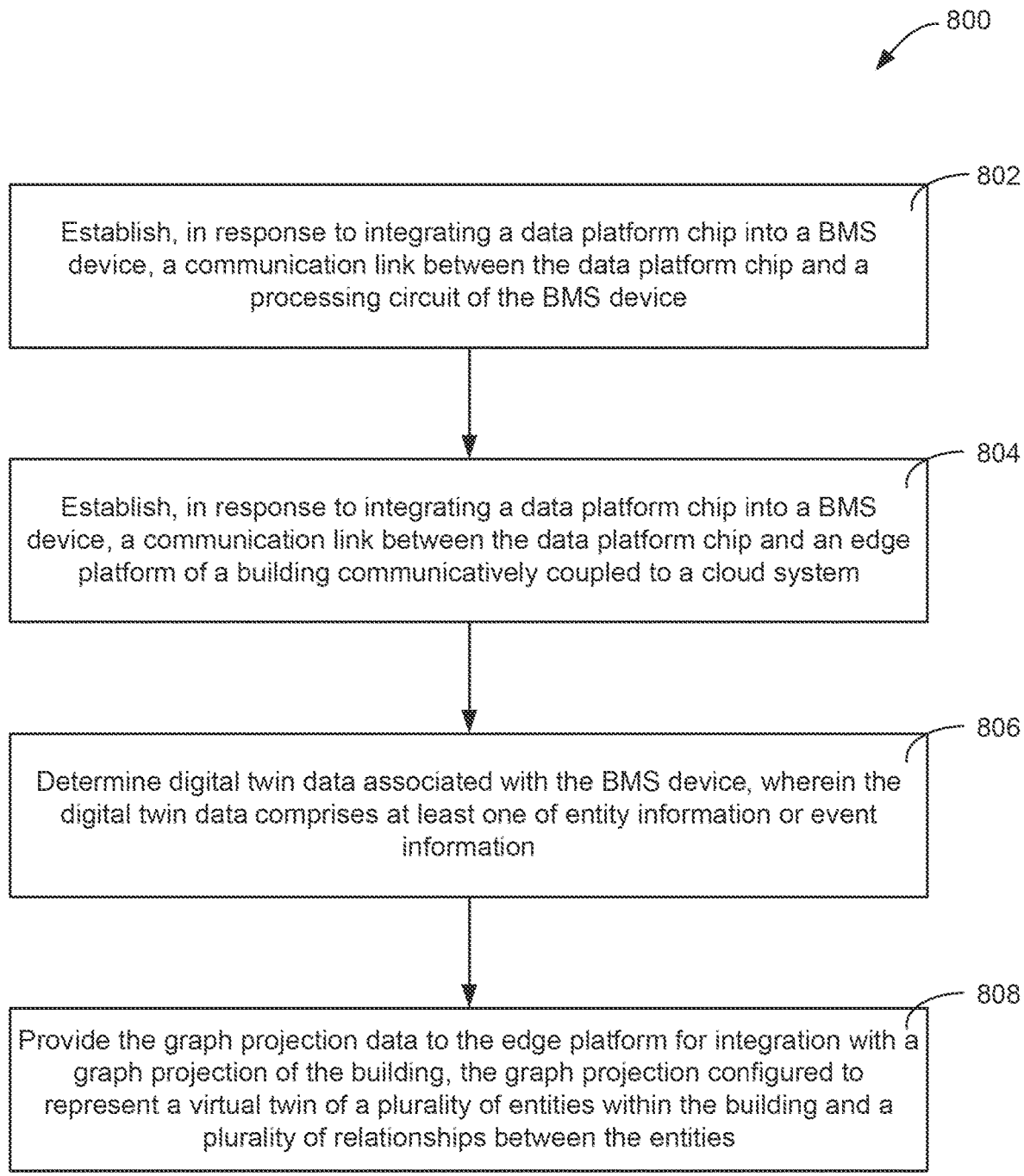
FIG. 8 is a flow diagram of a process for providing entity and relationship data associated with a BMS device to an edge platform, which can be performed by the data platform interface of FIG. 7, according to some embodiments.

Referring now to FIG. 8, a flow diagram of process 800 for providing entity and relationship data associated with a BMS device to a building data platform is shown, according to some embodiments. Process 800 may be performed by any of the processing circuits described herein. For example, process 800 is performed by the BMS device 503, the building platform chip 500, the host controller 502, or any other device, piece of hardware, computer chip, etc.

Process 800 is shown to include establishing, in response to integrating a data platform chip into the BMS device, a communication link between the data platform chip and a processing circuit of the BMS device (step 802). The building platform chip 500 can be configured to establish a communication link such as a data channel, initiate a communication agreement, generate encryption keys for communication, etc. for communication between the building platform chip 500 and the host controller 502. Responsive to establishing the channel, the building platform chip 500 can use the communication channel between the building platform chip 500 the processing circuit of the BMS device 503, e.g., with the host controller 502, to retrieve data defining a digital twin of the BMS device 503, e.g., entity data or relationship data. The building platform chip 500 can retrieve the data defining the digital twin from the BMS device 503 by querying, reading, or requesting data stored in memory registers, memory locations, storage locations, etc. of the host controller 502.

Process 800 is shown to include establishing, in response to integrating a data platform chip into a BMS device, a communication link between the data platform chip and an edge platform of a building communicatively coupled to a cloud system (step 804). In some embodiments, the data platform chip includes device interface 720 which is communicably coupled with host controller 502. The data platform chip may also include the building platform chip 500, which is communicably connected to building data platform 100. As described herein, the data platform chip can be or include the system on a chip, in some embodiments. The data platform chip include both a device interface portion (e.g., device interface 720, etc.) and a data platform portion (e.g., building platform chip 500, etc.).

Process 800 is shown to include determining digital twin data associated with the BMS device, wherein the graph projection data comprises at least one of entity information or event information (step 806). In some embodiments, building platform chip 500 receives or determines digital twin data that defines a digital twin, graph projection, or building graph as described with reference to FIGS. 1-4. Process 800 is shown to include providing the graph projection data to the building data platform 100 for integration with a digital twin or graph projection of the building stored and/or managed by the building data platform 100 (step 808). The graph projection can represent a virtual twin of a plurality of entities within the building and a plurality of relationships between the entities. In some embodiments, building platform chip 500 may utilize gateway manager 714 to provide entity/relationship information to building data platform 100 via edge platform 102.

In some embodiments, the building platform chip 500 provides the data defining the digital twin via the communication link established in step 804 between the BMS device 103 and the building data platform 100. For example, the building platform chip 500 can establish a communication channel, communication link, exchange or generate encryption keys, etc. for communication between the building platform chip 500 and the building data platform 100 (e.g., the edge platform 102, the cloud platform 106, or the twin manager 108). The building platform chip 500 can transmit, send, or communicate the data defining the digital twin of the BMS device 503 to the building data platform 100. The building platform chip 500 can transmit the data defining the digital twin collected from the host controller 502. In some embodiments, the building platform chip 500 can transmit the data defining the digital twin of the BMS device 503 to the building data platform 100 via the network 104. In some embodiments, the building platform chip 500 generates the digital twin locally on the building data platform chip 500 based on the data collected from the host controller 502. The building platform chip 500 can transmit the digital twin to the building data platform 100 where the building data platform 100 can integrate the digital twin into a larger digital twin of the building. For example, the building data platform 100 can add one or more nodes or edges defining the BMS device 503 into a larger graph representing the entire building.

While the systems and methods described herein may be generally referring to entity/relationship information associated with BMS device 503 can be obtained and transmitted to edge platform 102, this is merely meant to be exemplary and should not be considered limiting. Other data sets and/or data types and be processed and/or determined, such as DIP switch addressed, MSTP network information, BACnet protocol information, and virtual twin data.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed:

1. A method, comprising:
   activating a building platform chip integrated with a circuit board of a building device of a building and coupled, via at least one trace of the circuit board, with a processing circuit of the circuit board of the building device;
   retrieving, by the building platform chip, first data from the processing circuit via the at least one trace of the building device through communication with the processing circuit;

generating, by the building platform chip using the retrieved first data, second data to cause a digital twin of the building device to be constructed; and transmitting, by the building platform chip, the second data to a server to cause the server to construct the digital twin.

2. The method of claim 1, comprising:

establishing, by the building platform chip, a communication link between the building platform chip and the processing circuit of the building device; and retrieving, by the building platform chip, the first data from the processing circuit through communication with the processing circuit.

3. The method of claim 1, comprising:

establishing, by the building platform chip, a communication link between the building platform chip and a building platform; and transmitting, by the building platform chip, the second data to the building platform through the communication link to construct the digital twin.

4. The method of claim 1, comprising:

integrating the building platform chip into the building device by:

inserting the building platform chip into a receiver of the building device to electrically couple the building platform chip to the processing circuit; or mounting the building platform chip to the circuit board of the building device to electrically couple the building platform chip to the processing circuit via at least one electrical trace.

5. The method of claim 1, wherein:

the digital twin includes a building graph comprising a plurality of nodes and a plurality of edges between the plurality of nodes;

the first data includes indications of a plurality of entities and indications of a plurality of relationships between the plurality of entities;

the method comprising:

constructing the building graph to include the plurality of nodes representing the plurality of entities and the plurality of edges between the plurality of nodes representing the plurality of relationships between the plurality of entities.

6. The method of claim 1, comprising:

constructing, by the building platform chip, the digital twin based on the first data defining the digital twin; and transmitting, by the building platform chip, the digital twin to a building platform responsive to construction of the digital twin.

7. The method of claim 1, comprising:

transmitting, by the building platform chip, the first data to a building platform, the building platform to construct the digital twin based on the first data and store the digital twin.

8. The method of claim 1, wherein the first data is at least one of:

entities comprising at least one of an indication of the building device, an indication of a point of the building device, an indication of a space that the building device is located in, or an indication of another building device related to the building device;

event data describing an event generated by the building device; or relationships between the entities.

9. The method of claim 1, comprising:

receiving new data defining the digital twin; and updating the digital twin of the building device through transmitting the new data defining the digital twin to a building platform.

10. A building device, comprising:

a processing circuit; and a building platform chip integrated with a circuit board of the building device and coupled, via at least one trace of the circuit board, to the processing circuit of the circuit board of the building device, the building platform chip configured to:

retrieve first data from the processing circuit via the at least one trace of the building device through communication with the processing circuit;

generate, using the retrieved first data, second data to cause a digital twin of the building device to be constructed; and transmit the second data to a server to cause the server to construct the digital twin.

11. The building device of claim 10, the building platform chip configured to:

establish a communication link between the building platform chip and the processing circuit of the building device in response to an integration of a building platform into the building device; and retrieve the first data from the processing circuit through communication with the processing circuit.

12. The building device of claim 10, the building platform chip configured to:

establish a communication link between the building platform chip and a building platform; and transmit the second data to the building platform through the communication link to construct the digital twin.

13. The building device of claim 10, wherein:

the digital twin includes a building graph comprising a plurality of nodes and a plurality of edges between the plurality of nodes;

the first data includes indications of a plurality of entities and indications of a plurality of relationships between the plurality of entities;

the building platform chip configured to:

construct the building graph to include the plurality of nodes representing the plurality of entities and the plurality of edges between the plurality of nodes representing the plurality of relationships between the plurality of entities.

14. The building device of claim 10, the building platform chip configured to:

construct the digital twin based on the first data defining the digital twin; and transmit the digital twin to a building platform responsive to construction of the digital twin.

15. The building device of claim 10, the building platform chip configured to:

transmit the second data defining the digital twin to a building platform, the building platform to construct the digital twin based on the second data and store the digital twin.

16. The building device of claim 10, wherein the first data is at least one of:

entities comprising at least one of an indication of the building device, an indication of a point of the building device, an indication of a space that the building device is located in, or an indication of another building device related to the building device;

event data describing an event generated by the building device; or relationships between the entities.

17. A building platform chip, configured to:
integrate with a circuit board of a building device and couple, via at least one trace of the circuit board, to a processing circuit of the circuit board of the building device;
retrieve first data from the processing circuit via the at least one trace of the building device through communication with the processing circuit;
generate, using the retrieved first data, second data to cause a digital twin of the building device to be constructed; and
transmit the second data to a server to cause the server to construct the digital twin.

18. The building platform chip of claim 17, configured to:
establish a communication link between the building platform chip and the processing circuit of the building device in response to an activation of the building platform chip; and
retrieve the first data from the processing circuit through communication with the processing circuit.

19. The building platform chip of claim 17, configured to:
establish a communication link between the building platform chip and a building platform; and
transmit the second data to the building platform through the communication link to construct the digital twin.

20. The building platform chip of claim 17, wherein:
the digital twin includes a building graph comprising a plurality of nodes and a plurality of edges between the plurality of nodes;
the first data includes indications of a plurality of entities and indications of a plurality of relationships between the plurality of entities;
the building platform chip configured to:
construct the building graph to include the plurality of nodes representing the plurality of entities and the plurality of edges between the plurality of nodes representing the plurality of relationships between the plurality of entities.

* * * * *